US011996927B2

(12) United States Patent
Ma et al.

(10) Patent No.: US 11,996,927 B2
(45) Date of Patent: May 28, 2024

(54) BEAM MEASUREMENT TIMING IN A WIRELESS COMMUNICATIONS SYSTEM

(71) Applicant: QUALCOMM Incorporated, San Diego, CA (US)

(72) Inventors: Liangping Ma, San Diego, CA (US); Xiao Feng Wang, San Diego, CA (US); Ayan Sengupta, San Diego, CA (US); Peter Gaal, San Diego, CA (US); Alberto Rico Alvarino, San Diego, CA (US); Bharat Shrestha, San Diego, CA (US); Umesh Phuyal, San Diego, CA (US); Jun Ma, San Diego, CA (US); Dan Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 134 days.

(21) Appl. No.: 17/389,210

(22) Filed: Jul. 29, 2021

(65) Prior Publication Data

US 2022/0038169 A1 Feb. 3, 2022

Related U.S. Application Data

(60) Provisional application No. 63/059,941, filed on Jul. 31, 2020.

(51) Int. Cl.
*H04B 7/08* (2006.01)
*H04W 24/08* (2009.01)
(Continued)

(52) U.S. Cl.
CPC ............ *H04B 7/088* (2013.01); *H04W 24/08* (2013.01); *H04W 24/10* (2013.01); *H04W 72/0446* (2013.01); *H04W 72/1263* (2013.01)

(58) Field of Classification Search
CPC .... H04B 7/088; H04B 7/1851; H04B 7/0695; H04W 24/08; H04W 24/10;
(Continued)

(56) References Cited

U.S. PATENT DOCUMENTS

2019/0182696 A1* 6/2019 Huang ................... H04W 24/10
2019/0305840 A1* 10/2019 Cirik ..................... H04W 76/38
(Continued)

FOREIGN PATENT DOCUMENTS

WO WO-2020092561 A1 5/2020
WO WO-2022008945 A1 * 1/2022

OTHER PUBLICATIONS

International Search Report and Written Opinion—PCT/US2021/043970—ISA/EPO—dated Nov. 10, 2021.

*Primary Examiner* — Chae S Lee
(74) *Attorney, Agent, or Firm* — Holland & Hart LLP

(57) ABSTRACT

Methods, systems, and devices for wireless communications are described. A network may be configured to provide a beam measurement configuration to a UE that indicates durations for monitoring transmission beams, and tuning a component of the UE between the monitoring. The durations may include a first portion that a UE may use for a tuning operation and a second portion that the UE may use to monitor for or measure a respective reference signal. In various examples, the indicated durations may include a third portion that the UE may use for another tuning operation, or the durations may overlap with one another during an overlap duration that the UE may use for another tuning operation. During the indicated durations, the network may refrain from transmitting other downlink data or control information for the UE, and the UE may refrain from monitoring for such other downlink data or control information.

28 Claims, 19 Drawing Sheets

(51) Int. Cl.
*H04W 24/10* (2009.01)
*H04W 72/0446* (2023.01)
*H04W 72/1263* (2023.01)

(58) Field of Classification Search
CPC ......... H04W 72/0446; H04W 72/1263; H04L 5/0048; H04L 5/0057
See application file for complete search history.

(56) References Cited

U.S. PATENT DOCUMENTS

| | | | |
|---|---|---|---|
| 2019/0306842 A1 | 10/2019 | Cirik et al. | |
| 2019/0312705 A1* | 10/2019 | Takano | H04L 25/0226 |
| 2019/0319833 A1 | 10/2019 | Nagaraja et al. | |
| 2020/0213161 A1* | 7/2020 | Zhang | H04L 5/0051 |
| 2020/0228182 A1* | 7/2020 | Nilsson | H04B 7/0647 |
| 2022/0407582 A1* | 12/2022 | Awad | H04B 7/088 |

* cited by examiner

```
┌─────────────────────────────────────────┐
│ Transmit a beam measurement configuration indicating a │
│     duration pattern for reference signal monitoring    │
│ associated with a plurality of beams and for tuning a radio │
│ of the UE for the reference signal monitoring, each beam │
│ of the plurality of beams associated with a respective one │
│    of a plurality of bandwidth parts of a radio frequency │
│   spectrum according to a beam frequency mapping        │
└─────────────────────────────────────────┘
                    │
                    ▼                               ⟶ 1805

┌─────────────────────────────────────────┐
│  Transmit, based at least in part on the duration pattern │
│      indicated by the beam measurement configuration,    │
│  reference signals for the plurality of beams, wherein the │
│        transmitting of the reference signals comprises    │
│ transmitting the respective reference signal for each beam │
│  of the plurality of beams using the respective bandwidth │
│    part associated with each beam according to the beam  │
│                    frequency mapping                     │
└─────────────────────────────────────────┘
                                                  ⟶ 1810
```

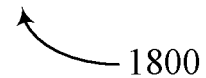

FIG.18

BEAM MEASUREMENT TIMING IN A
WIRELESS COMMUNICATIONS SYSTEM

CROSS REFERENCE

The present application for patent claims the benefit of U.S. Provisional Patent Application No. 63/059,941 by Ma et al., entitled "BEAM MEASUREMENT TIMING IN A WIRELESS COMMUNICATIONS SYSTEM," filed Jul. 31, 2020, assigned to the assignee hereof, and expressly incorporated by reference herein.

FIELD OF TECHNOLOGY

The following relates to wireless communications, including beam measurement timing in a wireless communications system.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some systems, a UE may monitor for reference signals to perform channel measurements, which may support evaluating channel quality. When monitoring for reference signals using different communication resources, a UE may retune a radio or other component of the UE to support such monitoring.

SUMMARY

The described techniques relate to improved methods, systems, devices, and apparatuses that support beam measurement timing in a wireless communications system. In some examples, a UE may switch between frequency intervals (e.g., bandwidth parts) of a radio frequency spectrum to measure reference signals for evaluating channel quality of the respective frequency interval. Additionally or alternatively, a UE may switch between beams (e.g., receive beams) to measure reference signals for evaluating different spatial resources. Thus, according to these and other examples, evaluation of different communication resources may involve a UE performing frequency retuning (e.g., tuning a radio from receiving at one bandwidth part to receiving at another bandwidth part), beam retuning (e.g., changing an analog or digital receive beam from one direction to another direction, including such techniques in a millimeter wave system), or some other type of retuning of a component of the UE. Such retuning may involve a transitional duration (e.g., a time gap, a retuning duration) during which a UE may not be configured for or capable of performing such monitoring or measurement, or other monitoring for other downlink data or control transmissions.

In accordance with examples as disclosed herein, a network may be configured to provide a beam measurement configuration to a UE that indicates monitoring durations (e.g., a duration pattern, a measurement or monitoring pattern) for monitoring different transmission beams (e.g., different beams of a transmitting device), and tuning a component of the UE between the monitoring of the different transmission beams. In some examples, the durations may include a first portion, which may be referred to as a gap duration, that a UE may use for a tuning operation (e.g., tuning to a target communication resource corresponding to a transmission beam), and a second portion that the UE may use to monitor for or measure a respective reference signal (e.g., using the target communication resource corresponding to the transmission beam). In various examples, the indicated monitoring durations may include a third portion that the UE may use for another tuning operation (e.g., to return to a previous communication resource corresponding to a previous transmission beam, to tune to another target communication resource corresponding to another target transmission beam), or the monitoring durations may overlap with one another during an overlap duration that the UE may use for another tuning operation (e.g., to tune to a communication resource associated with monitoring another transmission beam in the later monitoring duration). During the indicated monitoring durations, the network may refrain from transmitting signals for the UE that are unrelated to the reference signals for the UE, such as other downlink data or control information for the UE, and the UE may refrain from monitoring for other signaling (e.g., unrelated to the reference signal monitoring).

In some examples, the described techniques may be employed in a wireless communications system that supports transmission according to beams that are each associated with a respective frequency interval (e.g., bandwidth part) of a radio frequency spectrum. For example, a transmitting node of a non-terrestrial network may include a satellite, a drone, or some other overhead transmitter that communicates over beams having different beam coverages areas (e.g., on a ground surface or other reference surface), where neighboring coverage areas may be at least partially overlapping. To avoid interference between beams, each adjacent or neighboring beam may be associated with a different bandwidth part, thereby providing a frequency separation (e.g., orthogonality) between communications of the respective neighboring beams. The coverage areas of such a transmitting node may move relative to a ground reference (e.g., due to overhead movement of the transmitting node), such that maintaining a communication link with the transmitting node may involve relatively frequent evaluation or selection of beams or bandwidth parts.

To support conditions when a UE is located in or near an area of beam overlap (e.g., an area of overlapping beam coverage areas, an area where signaling of multiple beams may be received or are otherwise detectable), a UE may be configured to monitor for reference signals corresponding to the neighboring beams, which may be conveyed over different bandwidth parts. A beam measurement configuration may indicate durations (e.g., according to a duration pattern) for monitoring the bandwidth parts associated with the respective beams, and may further indicate which bandwidth parts or which beams the UE should monitor. Because the neighboring beams may be associated with different bandwidth parts, the durations may include a first portion during which a UE may tune a radio to the bandwidth part to be monitored for a given beam, and a second portion during which the UE may monitor the reference signal for the given beam using the bandwidth part corresponding to the given beam. In some examples, the described techniques may be combined with receive beamforming at the UE and, during the first portion of a monitoring duration or the second portion of the monitoring duration, the UE may perform analog or digital beam tuning to evaluate reception over different spatial resources (e.g., different receive directions, different receive ports).

By configuring a duration pattern for beam monitoring that includes both a measurement duration (e.g., a duration for measuring or receiving reference signals corresponding to a beam) and one or more retuning durations (e.g., gap durations), a wireless communications system may support improved flexibility and responsiveness for maintaining a communication link using different beams that are associated with different frequency intervals. For example, compared to techniques that do not account for retuning gaps for beam measurements, the techniques described herein may enable faster, more efficient, or more flexible beam selection in a system that associates respective beams with different bandwidth parts of a radio frequency spectrum, among other benefits. Such improvements may be particularly beneficial in high mobility scenarios, such as a non-terrestrial network, where movement of a transmitting device (e.g., a satellite), a receiving device (e.g., a UE), or both may involve relatively frequent reselection of beams and corresponding bandwidth parts to maintain a communication link.

A method for wireless communication at a UE is described. The method may include receiving a beam measurement configuration indicating a duration pattern for reference signal monitoring associated with a set of beams and for tuning a radio of the UE for the reference signal monitoring, each beam of the set of beams associated with a respective one of a set of bandwidth parts of a radio frequency spectrum according to a beam frequency mapping, monitoring, based on the duration pattern indicated by the beam measurement configuration, a reference signal in a bandwidth part of the set of bandwidth parts that is associated with a beam of the set of beams according to the beam frequency mapping, determining, based on the monitoring of the reference signal in the bandwidth part, a channel quality metric for the beam, and performing communications based on the determined channel quality metric for the beam.

An apparatus for wireless communication at a UE is described. The apparatus may include a processor, memory coupled with the processor, and instructions stored in the memory. The instructions may be operable, when executed by the processor, to cause the apparatus to receive a beam measurement configuration indicating a duration pattern for reference signal monitoring associated with a set of beams and for tuning a radio of the UE for the reference signal monitoring, each beam of the set of beams associated with a respective one of a set of bandwidth parts of a radio frequency spectrum according to a beam frequency mapping, monitor, based at least in part on the duration pattern indicated by the beam measurement configuration, a reference signal in a bandwidth part of the set of bandwidth parts that is associated with a beam of the set of beams according to the beam frequency mapping, determine, based on the monitoring of the reference signal in the bandwidth part, a channel quality metric for the beam, and perform communications based on the determined channel quality metric for the beam.

Another apparatus for wireless communication at a UE is described. The apparatus may include means for receiving a beam measurement configuration indicating a duration pattern for reference signal monitoring associated with a set of beams and for tuning a radio of the UE for the reference signal monitoring, each beam of the set of beams associated with a respective one of a set of bandwidth parts of a radio frequency spectrum according to a beam frequency mapping, means for monitoring, based on the duration pattern indicated by the beam measurement configuration, a reference signal in a bandwidth part of the set of bandwidth parts that is associated with a beam of the set of beams according to the beam frequency mapping, means for determining, based on the monitoring of the reference signal in the bandwidth part, a channel quality metric for the beam, and means for performing communications based on the determined channel quality metric for the beam.

A non-transitory computer-readable medium storing code for wireless communication at a UE is described. The code may include instructions executable by a processor to receive a beam measurement configuration indicating a duration pattern for reference signal monitoring associated with a set of beams and for tuning a radio of the UE for the reference signal monitoring, each beam of the set of beams associated with a respective one of a set of bandwidth parts of a radio frequency spectrum according to a beam frequency mapping, monitor, based at least in part on the duration pattern indicated by the beam measurement configuration, a reference signal in a bandwidth part of the set of bandwidth parts that is associated with a beam of the set of beams according to the beam frequency mapping, determine, based on the monitoring of the reference signal in the bandwidth part, a channel quality metric for the beam, and perform communications based on the determined channel quality metric for the beam.

In some examples of the method, apparatuses, and non-transitory computer-readable medium described herein, the monitoring may include operations, features, means, or instructions for tuning the radio of the UE, during a first portion of a duration of the indicated duration pattern, from a second bandwidth part to the bandwidth part that is associated with the beam and monitoring the reference signal, during a second portion of the duration after the first portion, in the bandwidth part that may be associated with the beam.

In some examples of the method, apparatuses, and non-transitory computer-readable medium described herein, the monitoring may include operations, features, means, or instructions for tuning the radio of the UE, during a third portion of the duration after the second portion, from the bandwidth part associated with the beam to the second bandwidth part.

Some examples of the method, apparatuses, and non-transitory computer-readable medium described herein may further include operations, features, means, or instructions for determining the first portion of the duration, the third portion of the duration, or both based on the beam measurement configuration and an indicated reference signal pattern.

Some examples of the method, apparatuses, and non-transitory computer-readable medium described herein may further include operations, features, means, or instructions for determining the first portion of the duration, the third portion of the duration, or both based on a tuning capability of the UE.

In some examples of the method, apparatuses, and non-transitory computer-readable medium described herein, the monitoring may include operations, features, means, or instructions for identifying that the duration overlaps with a second duration of the indicated duration pattern during an overlap duration that follows the second portion of the duration, tuning the radio of the UE, during the overlap duration, from the bandwidth part associated with the beam to a third bandwidth part of the set of bandwidth parts that may be associated with a second beam according to the beam frequency mapping, and monitoring a second reference signal in the third bandwidth part that may be associated with the second beam during the second duration.

In some examples of the method, apparatuses, and non-transitory computer-readable medium described herein, the monitoring may include operations, features, means, or instructions for monitoring, during a first duration of the indicated duration pattern, the reference signal in the bandwidth part associated with the beam and monitoring, during a second duration of the indicated duration pattern, a second reference signal in a second bandwidth part of the set of bandwidth parts that may be associated with a second beam of the set of beams according to the beam frequency mapping.

In some examples of the method, apparatuses, and non-transitory computer-readable medium described herein, the monitoring may include operations, features, means, or instructions for monitoring, during a duration of the indicated duration pattern, the reference signal in the bandwidth part associated with the beam and monitoring, during the duration of the indicated duration pattern, a second reference signal in a second bandwidth part of the set of bandwidth parts that may be associated with a second beam of the set of beams according to the beam frequency mapping.

Some examples of the method, apparatuses, and non-transitory computer-readable medium described herein may further include operations, features, means, or instructions for refraining from monitoring for downlink data transmissions or downlink control transmissions during durations of the indicated duration pattern.

In some examples of the method, apparatuses, and non-transitory computer-readable medium described herein, the beam measurement configuration includes an indication of a periodicity, a length of time, a time offset, or any combination thereof for durations of the duration pattern.

Some examples of the method, apparatuses, and non-transitory computer-readable medium described herein may further include operations, features, means, or instructions for determining, for a duration of the indicated duration pattern and based on an indication of a reference signal pattern, a first portion of the duration for the monitoring of the reference signal and determining, for the duration of the indicated duration pattern and based on the beam measurement configuration, a second portion of the duration before the first portion for retuning the radio of the UE.

In some examples of the method, apparatuses, and non-transitory computer-readable medium described herein, the reference signal pattern includes a channel state information reference signal pattern or a synchronization signal block pattern, or a combination thereof.

In some examples of the method, apparatuses, and non-transitory computer-readable medium described herein, the performing communications may include operations, features, means, or instructions for transmitting an indication of the channel quality metric for the beam.

In some examples of the method, apparatuses, and non-transitory computer-readable medium described herein, the receiving the beam measurement configuration may include operations, features, means, or instructions for receiving the beam measurement configuration from a node of a non-terrestrial network.

In some examples of the method, apparatuses, and non-transitory computer-readable medium described herein, the monitoring may include operations, features, means, or instructions for monitoring beam transmissions of a node of a non-terrestrial network.

A method for wireless communication at a node of a non-terrestrial network is described. The method may include transmitting a beam measurement configuration indicating a duration pattern for reference signal monitoring associated with a set of beams and for tuning a radio of the UE for the reference signal monitoring, each beam of the set of beams associated with a respective one of a set of bandwidth parts of a radio frequency spectrum according to a beam frequency mapping and transmitting, based on the duration pattern indicated by the beam measurement configuration, reference signals for the set of beams, where the transmitting of the reference signals includes transmitting the respective reference signal for each beam of the set of beams using the respective bandwidth part associated with each beam according to the beam frequency mapping.

An apparatus for wireless communication at a node of a non-terrestrial network is described. The apparatus may include a processor, memory coupled with the processor, and instructions stored in the memory. The instructions may be operable, when executed by the processor, to cause the apparatus to transmit a beam measurement configuration indicating a duration pattern for reference signal monitoring associated with a set of beams and for tuning a radio of the UE for the reference signal monitoring, each beam of the set of beams associated with a respective one of a set of bandwidth parts of a radio frequency spectrum according to a beam frequency mapping and transmit, based on the duration pattern indicated by the beam measurement configuration, reference signals for the set of beams, where the transmitting of the reference signals includes transmitting the respective reference signal for each beam of the set of beams using the respective bandwidth part associated with each beam according to the beam frequency mapping.

Another apparatus for wireless communication at a node of a non-terrestrial network is described. The apparatus may include means for transmitting a beam measurement configuration indicating a duration pattern for reference signal monitoring associated with a set of beams and for tuning a radio of the UE for the reference signal monitoring, each beam of the set of beams associated with a respective one of a set of bandwidth parts of a radio frequency spectrum according to a beam frequency mapping and means for transmitting, based on the duration pattern indicated by the beam measurement configuration, reference signals for the set of beams, where the transmitting of the reference signals includes transmitting the respective reference signal for each beam of the set of beams using the respective bandwidth part associated with each beam according to the beam frequency mapping.

A non-transitory computer-readable medium storing code for wireless communication at a node of a non-terrestrial network is described. The code may include instructions executable by a processor to transmit a beam measurement configuration indicating a duration pattern for reference signal monitoring associated with a set of beams and for tuning a radio of the UE for the reference signal monitoring, each beam of the set of beams associated with a respective one of a set of bandwidth parts of a radio frequency spectrum according to a beam frequency mapping and transmit, based on the duration pattern indicated by the beam measurement configuration, reference signals for the set of beams, where the transmitting of the reference signals includes transmitting the respective reference signal for each beam of the set of beams using the respective bandwidth part associated with each beam according to the beam frequency mapping.

In some examples of the method, apparatuses, and non-transitory computer-readable medium described herein, the transmitting of the reference signals may include operations, features, means, or instructions for refraining from transmitting the reference signals during a first portion of a duration of the indicated duration pattern and transmitting a reference signal during a second portion of the duration after the first portion.

In some examples of the method, apparatuses, and non-transitory computer-readable medium described herein, the transmitting of the reference signals may include operations, features, means, or instructions for refraining from transmitting the reference signals during a third portion of the duration after the second portion.

In some examples of the method, apparatuses, and non-transitory computer-readable medium described herein, the transmitting of the reference signals may include operations, features, means, or instructions for refraining from transmitting the reference signals after the second portion of the duration and during an overlap of the duration and a second duration of the indicated duration pattern.

In some examples of the method, apparatuses, and non-transitory computer-readable medium described herein, the transmitting of the reference signals m may include operations, features, means, or instructions for transmitting, during a first duration of the indicated duration pattern, a first reference signal for a first beam of the set of beams using a first bandwidth part of the set of bandwidth parts associated with the first beam according to the beam frequency mapping and transmitting, during a second duration of the indicated duration pattern, a second reference signal for a second beam of the set of beams using a second bandwidth part of the set of bandwidth parts, different than the first bandwidth part, associated with the second beam according to the beam frequency mapping.

In some examples of the method, apparatuses, and non-transitory computer-readable medium described herein, the transmitting of the reference signals may include operations, features, means, or instructions for transmitting, during a duration of the indicated duration pattern, a first reference signal for a first beam of the set of beams using a first bandwidth part associated with the first beam according to the beam frequency mapping, and a second reference signal for a second beam of the set of beams using a second bandwidth part, different than the first bandwidth part, associated with the second beam according to the beam frequency mapping.

Some examples of the method, apparatuses, and non-transitory computer-readable medium described herein may further include operations, features, means, or instructions for refraining from transmitting downlink data transmissions or downlink control transmissions during durations of the indicated duration pattern.

In some examples of the method, apparatuses, and non-transitory computer-readable medium described herein, the beam measurement configuration includes an indication of a periodicity, a length of time, a time offset, or any combination thereof associated with the duration pattern.

In some examples of the method, apparatuses, and non-transitory computer-readable medium described herein, the beam measurement configuration includes an indication to determine one or more gap portions, for retuning operations during durations of the duration pattern, based on an indicated reference signal pattern.

In some examples of the method, apparatuses, and non-transitory computer-readable medium described herein, the indicated reference signal pattern includes a channel state information reference signal pattern, or a synchronization signal block pattern, or a combination thereof.

Some examples of the method, apparatuses, and non-transitory computer-readable medium described herein may further include operations, features, means, or instructions for receiving, from a UE, an indication of a channel quality metric determined by the UE for one or more of the set of beams.

BRIEF DESCRIPTION OF THE DRAWINGS

FIGS. 15 through 19 show flowcharts illustrating methods that support beam measurement timing in a wireless communications system in accordance with aspects of the present disclosure.

DETAILED DESCRIPTION

Figure 1:
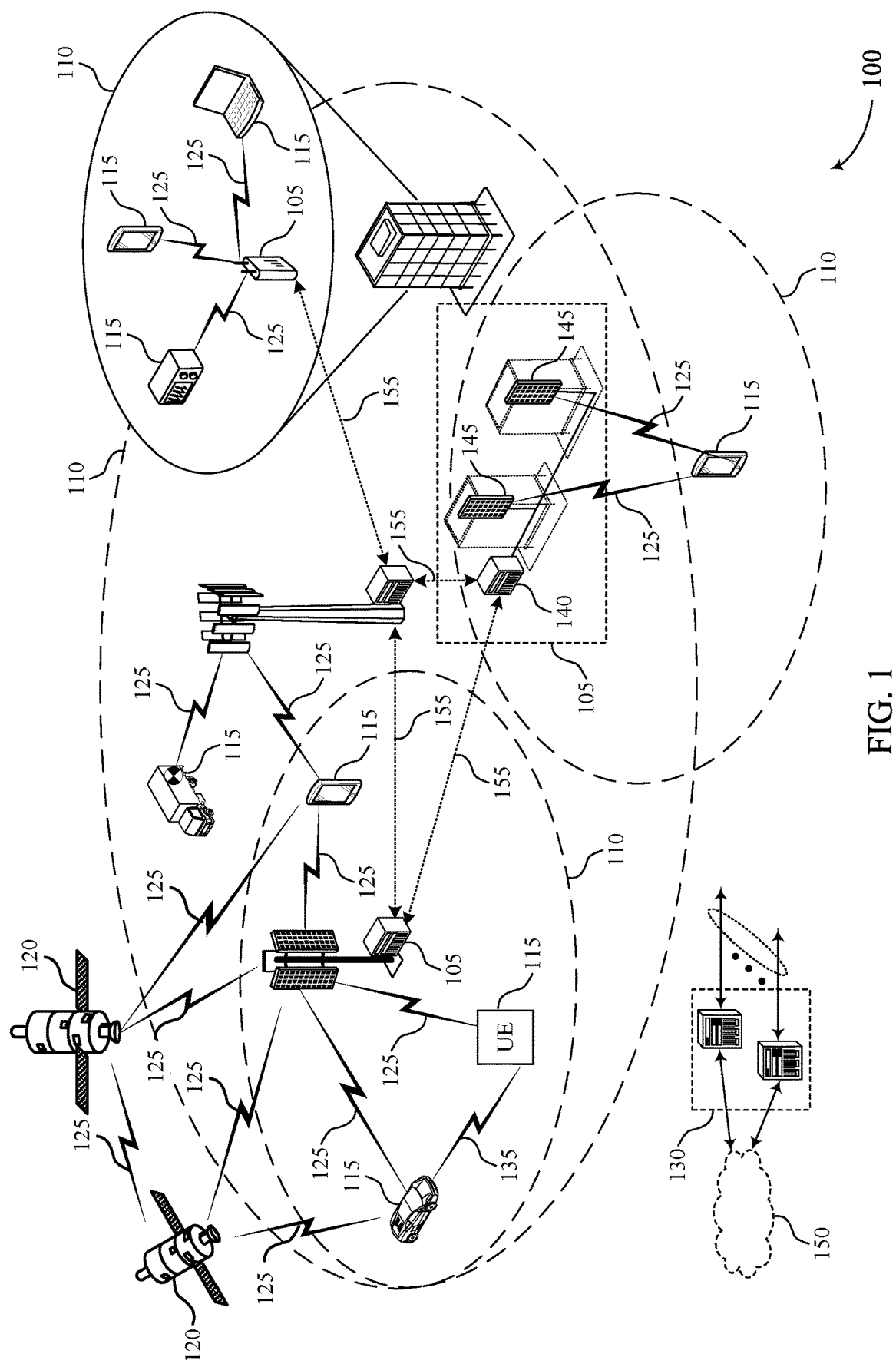
FIG. 1 illustrates an example of wireless communications system that supports beam measurement timing in a wireless communications system in accordance with aspects of the present disclosure.

The described techniques relate to improved methods, systems, devices, and apparatuses that support beam measurement timing in a wireless communications system. In some examples, a UE may switch between frequency intervals (e.g., bandwidth parts) of a radio frequency spectrum to measure reference signals for evaluating channel quality of the respective frequency interval. Additionally or alternatively, a UE may switch between beams (e.g., receive beams) to measure reference signals for evaluating different spatial resources. Thus, according to these and other examples, evaluation of different communication resources may involve a UE performing frequency retuning (e.g., tuning a radio from receiving at one bandwidth part to receiving at another bandwidth part), beam retuning (e.g., changing an analog or digital receive beam from one direction to another direction, including such techniques in a millimeter wave system), or some other type of retuning of a component of the UE. Such retuning may involve a transitional duration (e.g., a time gap, a retuning duration) during which a UE may not be configured for or capable of performing such monitoring or measurement, or other monitoring for other downlink data or control transmissions.

In accordance with examples as disclosed herein, a network may be configured to provide a beam measurement configuration to a UE that indicates monitoring durations (e.g., a duration pattern, a measurement or monitoring pattern) for monitoring different transmission beams (e.g., different beams of a transmitting device), and tuning a component of the UE between the monitoring of the different transmission beams. In some examples, the durations may include a first portion, which may be referred to as a gap duration, that a UE may use for a tuning operation (e.g., tuning to a target communication resource corresponding to a transmission beam), and a second portion that the UE may use to monitor for or measure a respective reference signal (e.g., using the target communication resource corresponding to the transmission beam). In various examples, the indicated monitoring durations may include a third portion that the UE may use for another tuning operation (e.g., to return to a previous communication resource corresponding to a previous transmission beam, to tune to another target communication resource corresponding to another target transmission beam), or the monitoring durations may overlap with one another during an overlap duration that the UE may use for another tuning operation (e.g., to tune to a communication resource associated with monitoring another transmission beam in the later monitoring duration). During the indicated monitoring durations, the network may refrain from transmitting signals for the UE that are unrelated to the reference signals for the UE, such as other downlink data or control information for the UE, and the UE may refrain from monitoring for such other signaling (e.g., unrelated to the reference signal monitoring).

In some examples, the described techniques may be employed in a wireless communications system that supports transmission according to beams that are each associated with a respective frequency interval (e.g., bandwidth part) of a radio frequency spectrum. For example, a transmitting node of a non-terrestrial network may include a satellite, a drone, or some other overhead transmitter that communicates over beams having different beam coverages areas (e.g., on a ground surface or other reference surface), where neighboring coverage areas may be at least partially overlapping. To avoid interference between beams, each adjacent or neighboring beam may be associated with a different bandwidth part, thereby providing a frequency separation (e.g., orthogonality) between communications of the respective neighboring beams. The coverage areas of such a transmitting node may move relative to a ground reference (e.g., due to overhead movement of the transmitting node), such that maintaining a communication link with the transmitting node may involve relatively frequent evaluation or selection of beams or bandwidth parts.

To support conditions when a UE is located in or near an area of beam overlap (e.g., an area of overlapping beam coverage areas, an area where signaling of multiple beams may be received or are otherwise detectable), a UE may be configured to monitor for reference signals corresponding to the neighboring beams, which may be conveyed over different bandwidth parts. A beam measurement configuration may indicate durations (e.g., according to a duration pattern) for monitoring the bandwidth parts associated with the respective beams, and may further indicate which bandwidth parts or which beams the UE should monitor. Because the neighboring beams may be associated with different bandwidth parts, the durations may include a first portion during which a UE may tune a radio to the bandwidth part to be monitored for a given beam, and a second portion during which the UE may monitor the reference signal for the given beam using the bandwidth part corresponding to the given beam. In some examples, the described techniques may be combined with receive beamforming at the UE and, during the first portion of a monitoring duration or the second portion of the monitoring duration, the UE may perform analog or digital beam tuning to evaluate reception over different spatial resources (e.g., different receive directions, different receive ports).

By configuring a duration pattern for beam monitoring that includes both a measurement duration (e.g., a duration for measuring or receiving reference signals corresponding to a beam) and one or more retuning durations (e.g., gap durations), a wireless communications system may support improved flexibility and responsiveness for maintaining a communication link using different beams that are associated with different frequency intervals. For example, compared to techniques that do not account for retuning gaps for beam measurements, the techniques described herein may enable faster, more efficient, or more flexible beam selection in a system that associates respective beams with different bandwidth parts of a radio frequency spectrum, among other benefits. Such improvements may be particularly beneficial in high mobility scenarios, such as a non-terrestrial network, where movement of a transmitting device (e.g., a satellite), a receiving device (e.g., a UE), or both may involve relatively frequent reselection of beams and corresponding bandwidth parts to maintain a communication link.

Aspects of the disclosure are initially described in the context of wireless communications systems and related timing for communicating reference signals for beam measurement over different frequency intervals. Aspects of the disclosure are further illustrated by and described with reference to apparatus diagrams, system diagrams, and flowcharts that relate to beam measurement timing in a wireless communications system.

FIG. 1 illustrates an example of a wireless communications system 100 that supports beam measurement timing in a wireless communications system in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 155 (e.g., via an S1, N2, N3, or other interface). The base stations 105 may communicate with one another over the backhaul links 155 (e.g., via an X2, Xn, or other interface) either directly (e.g., directly between base stations 105), or indirectly (e.g., via core network 130), or both. In some examples, the backhaul links 155 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol)

and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier.

One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof.

For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

Wireless communications system 100 may also include one or more satellites 120 (e.g., in a non-terrestrial network (NTN) configuration), which may communicate with base stations 105 or the core network 130 via gateways (e.g., ground-based terminals, NTN gateways). Satellites 120 may also communicate with UEs 115, which may include other high altitude or terrestrial communications devices. In various examples, a satellite 120 itself may be an example of a base station 105 (e.g., supporting a gNB processed payload), or a satellite 120 may provide a relay of signals between a base station 105 and UEs 115 (e.g., in a transparent satellite configuration, where a satellite 120 and a gateway may be configured together as a remote radio unit). A satellite 120 may be any suitable type of communication satellite configured to relay or otherwise support communications between different devices in the wireless communications system 100. A satellite 120 may be an example of a space satellite, a balloon, a dirigible, an airplane, a drone, an unmanned aerial vehicle, or other vehicle which may support communications from a generally non-terrestrial, overhead, or elevated position. In some examples, a satellite 120 may be in a geosynchronous or geostationary earth orbit, a low earth orbit, or a medium earth orbit. A satellite 120 may be a multi-beam satellite configured to provide service for multiple service beam coverage areas in a configured geographical service area. The satellite 120 may be any distance away from the surface of the earth or other reference surface.

In some examples, a cell may be provided or established by a satellite 120 as part of a non-terrestrial network. A satellite 120 may, in some cases, perform the functions of a base station 105, act as a bent-pipe satellite, or act as a regenerative satellite, or a combination thereof. In some examples, a satellite 120 may be an example of a smart satellite, or a satellite with intelligence or other communications processing capability. For example, a smart satellite may be configured to perform more functions than a regenerative satellite (e.g., may be configured to perform particular algorithms beyond those used in regenerative satellites, to be reprogrammed). In a bent-pipe transponder configuration, a satellite 120 may be configured to receive signals from ground stations (e.g., gateways, base stations 105, a core network 130) and transmit those signals to different ground stations or terminals (e.g., UEs 115, base stations 105). In some cases, a satellite 120 supporting a bent-pipe transponder configuration may amplify signals or shift from uplink frequencies to downlink frequencies. In some examples, a satellite 120 supporting a regenerative transponder configuration may relay signals like a bent-pipe transponder configuration, but may also use on-board processing to perform other functions. Examples of these other functions may include demodulating a received signal, decoding a received signal, re-encoding a signal to be transmitted, or modulating the signal to be transmitted, or a combination thereof. In some examples, a satellite 120 supporting a bent pipe transponder configuration or regenerative transponder configuration may receive a signal from a base station 105 and may relay the signal to a UE 115 or base station 105, or vice-versa.

In accordance with examples as disclosed herein, the wireless communications system 100 may be configured to provide (e.g., via a base station 105, via a satellite 120) a beam measurement configuration to a UE 115 that indicates durations (e.g., according to a duration pattern) for monitoring different transmission beams (e.g., different beams of a transmitting device) that are each associated with a respective bandwidth part, and tuning a component of the UE between the monitoring of the different transmission beams. In some examples, the durations may include a first portion that a UE 115 may use for a tuning operation (e.g., tuning to a target bandwidth part corresponding to a transmission beam to be monitored), and a second portion that the UE 115 may use to monitor for or measure a respective reference signal (e.g., using the target bandwidth part corresponding to the transmission beam). In various examples, the durations indicated by the duration pattern may include a third portion that the UE 115 may use for another tuning operation (e.g., to return to a previous bandwidth part corresponding to a previous transmission beam or other communications, to tune to another target bandwidth part corresponding to another target transmission beam), or the durations may overlap with one another during an overlap duration that the UE 115 may use for another tuning operation (e.g., to tune to a bandwidth part associated with monitoring another transmission beam in the later monitoring duration).

By configuring a duration pattern for beam monitoring that include both a measurement duration (e.g., a duration for measuring or receiving reference signals corresponding to a beam) and one or more tuning durations (e.g., for tuning a radio between bandwidth parts), the wireless communications system 100 may support improved flexibility and responsiveness for maintaining a communication link 125 using different beams that are associated with different bandwidth parts. For example, compared to techniques that do not account for retuning gaps for beam measurements, the techniques described herein may enable faster, more efficient, or more flexible beam selection in a system that associates respective beams with different bandwidth parts of a radio frequency spectrum, among other benefits. Such improvements may be particularly beneficial in high mobility scenarios, such as a non-terrestrial network, where movement of a transmitting device (e.g., a satellite 120), a receiving device (e.g., a UE 115), or both may involve relatively frequent reselection of beams and corresponding bandwidth parts to maintain a communication link.

Figure 2:
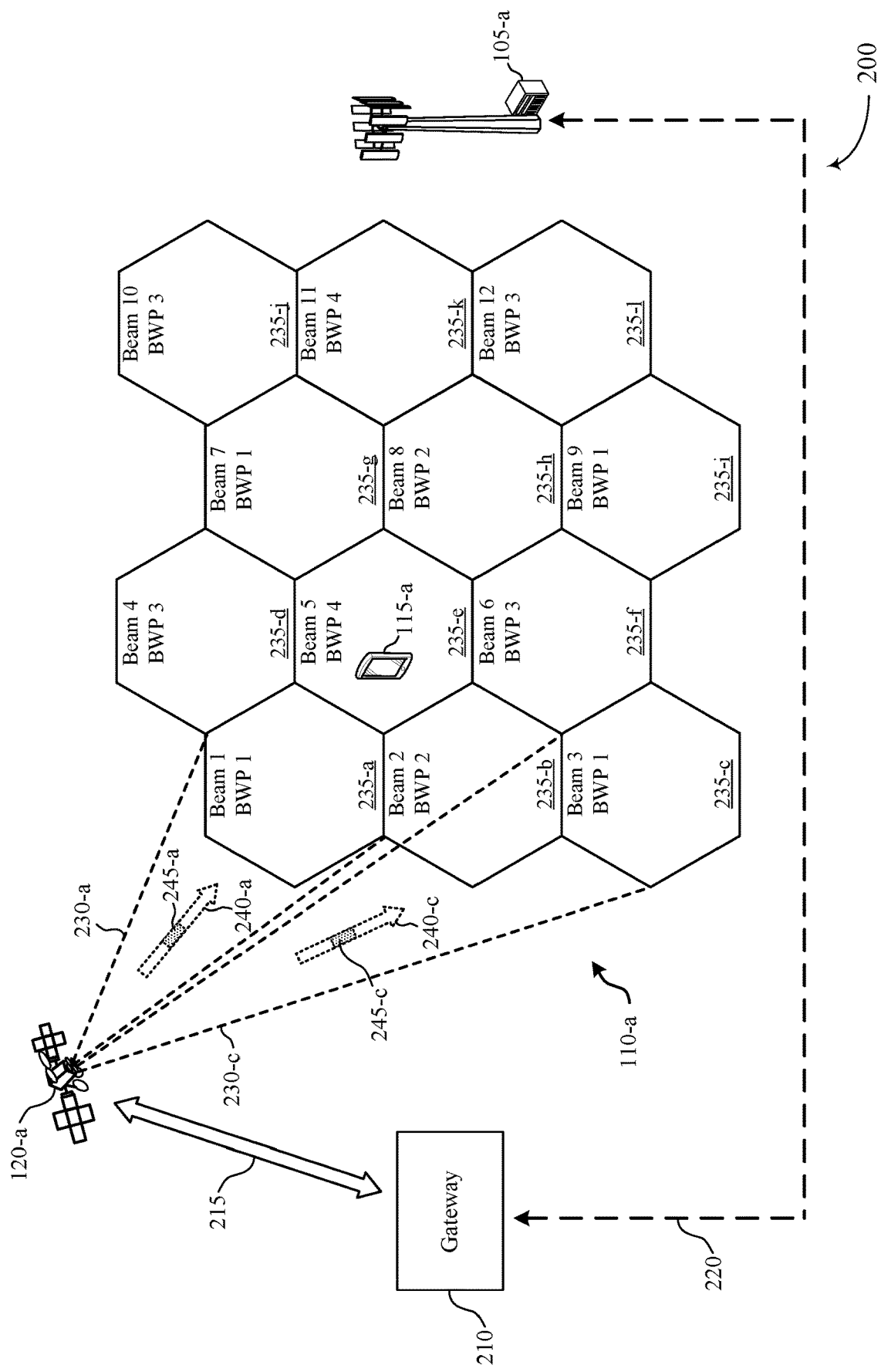
FIG. 2 illustrates an example of a wireless communications system that supports beam measurement timing in a wireless communications system in accordance with aspects of the present disclosure.

FIG. 2 illustrates an example of a wireless communications system 200 that supports beam measurement timing in a wireless communications system in accordance with aspects of the present disclosure. In some examples, the wireless communications system 200 may implement aspects of the wireless communications system 100. For example, wireless communications system 200 may include a UE 115-*a* and a satellite 120-*a*. In some examples, the wireless communications system 200 may also include a gateway 210, or a base station 105-*a*, or both. In various examples, one or more of the satellite 120-*a*, the gateway 210, or base station 105-*a*, or various combinations thereof, may be connected with a network, such as a core network 130 described with reference to FIG. 1.

The satellite 120-*a* may be configured to support communications over a geographic coverage area 110-*a*. The geographic coverage area 110-*a* may be located at a relatively fixed location (e.g., when the satellite 120-*a* is in a geostationary orbit or otherwise generally fixed overhead location), or may move or sweep across locations (e.g., as a moving geographic coverage area, such as when the satellite 120-*a* is in a low-earth orbit or medium earth orbit, or is otherwise moving overhead).

In some examples, the satellite 120-*a* may be an example of, or configured to operate as, a smart satellite, where the satellite 120-a supports a capability for processing communications associated with the coverage area 110-a (e.g., uplink communications, downlink communications, or both). In examples where the satellite 120-a is configured to operate as a smart satellite, the satellite 120-a may be an example of a base station 105 as described herein (e.g., where the satellite 120-a operates as a gNB or other type of base station), and the satellite 120-a may or may not communicate with a core network 130 via the gateway 210 (e.g., over a gateway communication link 215).

In some examples, the satellite 120-a may be an example of, or configured to operate as, a bent-pipe transponder or a regenerative transponder, where the satellite 120-a may operate as a relay between the gateway 210 and one or more devices within the geographic coverage area 110-a (e.g., relaying signals received from the geographic coverage area 110-a over a gateway communication link 215, relaying signals received from the gateway 210 over a gateway communication link 215 as transmissions to devices in the geographic coverage area 110-a). In examples where the satellite 120-a is configured to operate as a bent-pipe or regenerative transponder, the gateway 210, or the combination of the gateway 210 and the satellite 120-a, may be an example of a base station 105 as described herein (e.g., where the gateway 210 operates as a gNB or other type of base station, where the combination of the satellite 120-a and the gateway 210 operates as a gNB or other type of base station). In some examples, the gateway 210 may communicate with a base station 105 (e.g., base station 105-a, via a communication link 220), and the combination of the gateway 210 and the satellite 120-a may be configured together as a remote radio unit of the base station 105. In some examples, the gateway 210 itself may be configured to operate as a base station 105 (e.g., in a base station entity included in or otherwise co-located with the gateway 210).

The satellite 120-a may be configured to support communications using a plurality of transmission or reception beams, which may refer to spatial or directional communication resources formed by or otherwise supported by an antenna array of the satellite 120-a according to various beamforming techniques. For example, the satellite 120-a may be configured to support a plurality of beams 230, which may refer to downlink beams (e.g., downlink transmission beams) that support downlink communications 240 over the geographic coverage area 110-a. Each beam 230 may be associated with a corresponding beam coverage area 235 (e.g., beam coverage area 235-a corresponding to beam 230-a, and so on), and a plurality of beams 230 or beam coverage areas 235 (e.g., beam coverage areas 235-a through 235-1) may be distributed across the geographic coverage area 110-a. In some examples, beams 230 may support both downlink and uplink communications. In some examples, a first set of beams 230 (e.g., transmission beams) may support downlink communications and a second set of beams 230 (e.g., reception beams, beams of a different antenna array, beams associated with different directions or different beam coverage areas 235) may support uplink communications. In various examples, each of the beams 230 may be configured to operate as a different cell, or one or more cells may be configured according to sets of two or more beams 230, or all of the beams 230 may be configured to operate as a single cell.

Although the beam coverage areas 235 are shown as nested hexagonal areas for illustrative purposes, beams 230 may have some degree of overlap. For example, transmitted signal energy from one beam 230 may be incident on one or more beam coverage areas 235 that are adjacent to the beam coverage area 235 corresponding to the transmitting beam 230 (e.g., transmissions of a beam 230 associated with the beam coverage area 235-e may be incident on one or more of beam coverage areas 235-a, 235-b, 235-d, 235-f, 235-g, or 235-h, and transmissions of beams 230 associated beam coverage areas 235-a, 235-b, 235-d, 235-f, 235-g, or 235-h, may be incident on the beam coverage area 235-e and so on). To reduce interference between adjacent or neighboring beams 230, each of the beams 230 may be configured with a respective bandwidth part such that adjacent beams 230 are configured for communication over different bandwidth parts. In one example, such frequency separation may be provided by a pattern of four bandwidth parts, each spanning a different range of a radio frequency spectrum (e.g., Beams 1, 3, 7, and 9 being associated with a BWP 1, Beams 2 and 8 being associated with a BWP 2, Beams 4, 6, 10, and 12 being associated with a BWP 3, and Beams 5 and 11 being associated with a BWP 4).

In some examples, the UE 115-a may establish a communication link with or via the satellite 120-a while the UE 115-a is located within the geographic coverage area 110-a. To maintain such a communication link, the UE 115-a may switch between beams 230 relatively frequently, due to mobility of the UE 115-a (e.g., where the UE 115-a moves from one beam coverage area 235 to another), mobility of the satellite 120-a (e.g., where the geographic coverage area 110-a or one or more beam coverage areas 235 move relative to the UE 115-a), or various combinations thereof. In some examples, to support such beam switching or selection, the UE 115-a may perform beam measurement operations to evaluate channel quality for communications via one or more beams 230. For example, the UE 115-a may monitor or measure reference signals 245 included in the downlink communications 240 for respective beams 230.

In the example of wireless communications system 200, to perform such measurements on different beams 230, the UE 115-a may tune a radio of the UE 115-a to listen for or otherwise receive such reference signals 245. For example, to monitor reference signals of a beam 230 corresponding to the beam coverage area 235-e (e.g., a current beam, a beam used for communications between the satellite 120-a and the UE 115-a), a radio may be tuned to BWP 4. For the evaluation of channel quality of neighboring beams, to monitor reference signals of beams 230 associated with beam coverage areas 235-a or 235-g, a radio of the UE 115-a may be tuned to BWP 1, to monitor reference signals of beams 230 associated with beam coverage areas 235-b or 235-h, a radio of the UE 115-a may be tuned to BWP 2, and to monitor reference signals of beams 230 associated with beam coverage areas 235-d or 235-f, a radio of the UE 115-a may be tuned to BWP 3.

To support such monitoring between beams corresponding to different bandwidth parts, the wireless communications system 200 may configure a time gap between reference signal transmission or monitoring occasions for frequency retuning (e.g., for changing from one bandwidth part to another). In some examples, such a gap may also be provided between reference signal transmission or monitoring occasions for beam retuning (e.g., changing an analog reception beam at the UE 115-a, which may be operating in a millimeter wave). In some examples, measurement gap techniques may be associated with radio resource management (RRM) gap configuration. For example, a measurement gap may be configured with a measurement gap periodicity (e.g., a measurement gap repetition period), a measurement gap offset (e.g., a duration between a measurement gap and a reference time), or a measurement gap length (e.g., a measurement gap window, a duration of a measurement gap, a length in time). In some examples, to support signal propagation delays between a transmitting device and a receiving device (e.g., between the satellite 120-a and the UE 115-a), a measurement gap may be configured according to a measurement gap timing advance, which may be established based on evaluated signal exchange and associated signal propagation delays between devices.

To support various aspects of a non-terrestrial network (e.g., relatively frequent mobility between beams 230 corresponding to different bandwidth parts, relatively long propagation delays between the satellite 120-a and the UE 115-a), the configuration of monitoring duration patterns in the wireless communications system 200 may involve greater flexibility or finer granularity of monitoring timing than other techniques. For example, some techniques for reference signal monitoring may have a mismatch of periodicity compared with signaling of the wireless communications system 200. In one example, a periodicity for a measurement gap may be configurable to be 20, 40, 80, or 120 milliseconds (ms), which may be suitable for some types of reporting (e.g., using a synchronization signal block (SSB) for beam management), but for techniques using channel state information reference signals (CSI-RS), the periodicity may be between 4 slots and 640 slots. In some examples, such a coarse granularity may be inefficient for measurement techniques using CSI-RS. For example, a CSI-RS resource may span less than or equal to four symbol durations, which is shorter than the duration of one slot. If there is only frequency retuning and a change in analog beamforming, a delay may be less than or equal to four symbol durations, but a preferred total delay may be less than or equal to eight symbol durations. In some techniques, the minimum gap length may be 1.5 ms (e.g., approximately 21 symbol durations in some configurations), which may be unnecessarily long for supporting beam measurement techniques according to different beams 230 being associated with different bandwidth parts, and accordingly may not support sufficient mobility or beam selection latency in the wireless communications system 200.

In accordance with examples as disclosed herein, the wireless communications system 200 may support adding time gaps to a beam measurement procedure for beams 230 that are each associated with different bandwidth parts. The beam measurement procedure may include the UE 115-a reporting Layer 1 quantities such as Layer 1 reference signal received power (L1-RSRP), or other channel quality metric (e.g., signal-to-noise ratio (SNR), reference signal received quality (RSRQ), signal to interference and noise ratio (SINR)). In various examples, the time gaps or monitoring durations of a duration pattern may be indicated explicitly, or may be indicated in a manner that the UE 115-a can infer their configuration (e.g., from a configuration of relevant reference signals, such as adding a gap duration before or after a configured reference signal duration).

In some examples, the UE 115-a may transmit a channel quality report to or via the same device or system that transmits the beams 230 (e.g., the satellite 120-a), which may include a transmission to the satellite 120-a when the satellite 120-a serves as a base station 105 (e.g., in a gNB processed payload configuration), or a transmission via or through the satellite 120-a to the gateway 210 (over communication link 215), or to a base station 105 (e.g., base station 105-a, over communication link 220) in a transparent satellite configuration (e.g., when the satellite 120-a operates as a bent-pipe or regenerative transponder).

Figure 3:
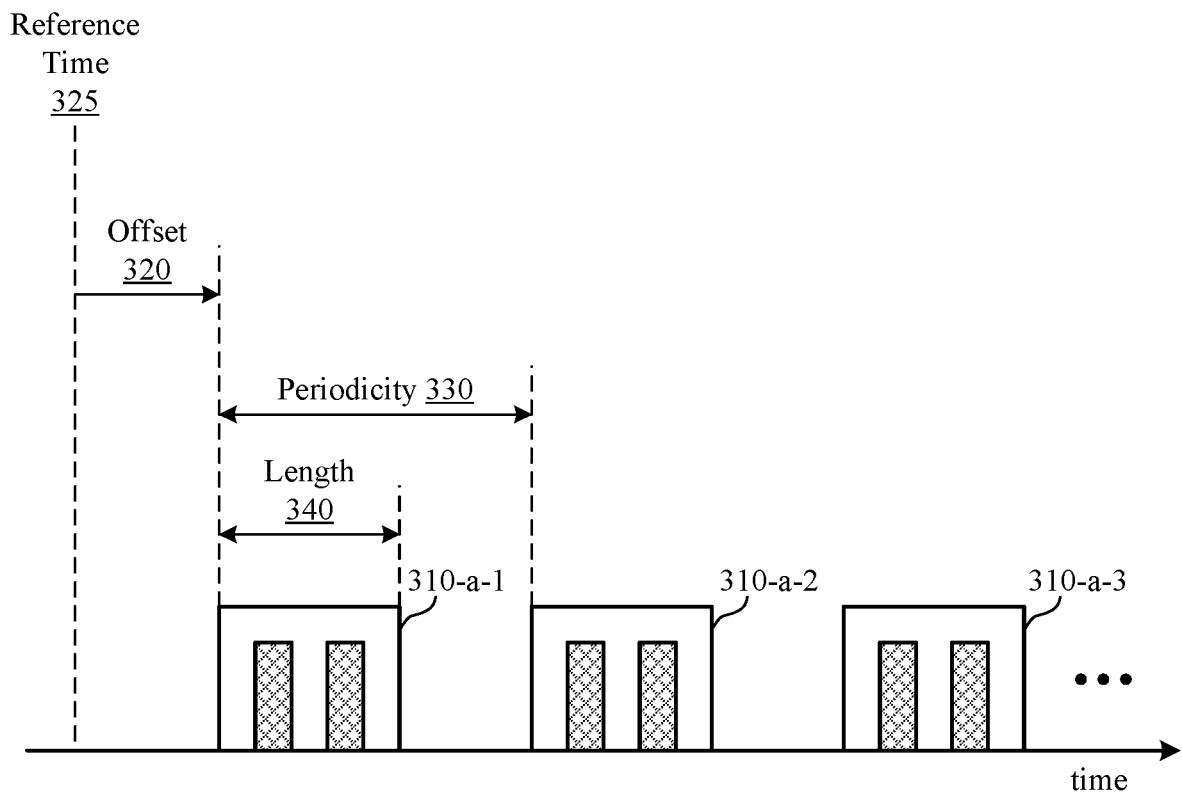
FIG. 3 illustrates an example of a duration pattern that supports beam measurement timing in a wireless communications system in accordance with aspects of the present disclosure.

FIG. 3 illustrates an example of a duration pattern 300 that supports beam measurement timing in a wireless communications system in accordance with aspects of the present disclosure. The duration pattern 300 may be illustrative of a duration pattern that may be employed in the wireless communications system 200 described with reference to FIG. 2.

In the example of duration pattern 300, a set of durations 310-a (e.g., monitoring durations) may be defined according to a duration pattern. Each of the durations 310-a may include one or more durations for reference signals 315 (e.g., for transmitting or monitoring reference signals 315, which may be an example of reference signals 245 described with reference to FIG. 2), as well as one or more gap durations (e.g., between a beginning of a duration 310-a and a first reference signal 315, between reference signals 315, between a last reference signal 315 and an end of a duration 310-a) to support various retuning operations at a UE 115 between reference signal monitoring occasions. In some examples, to support discontinuous reception or other power or processing efficiencies, a UE 115 may be awake during durations 310 (e.g., for retuning or monitoring), and may be in a sleep mode or idle mode during time intervals not included in a duration 310. Although three durations 310-a are illustrated in the duration pattern 300, the configuration of a duration pattern in accordance with examples as disclosed herein may include any quantity of durations 310, which may include a configuration of a static or finite quantity of durations 310, or a configuration for durations 310 to continue until a change in a beam measurement configuration (e.g., in an ongoing configuration).

A duration pattern such as the pattern of durations 310-a may be signaled to a UE 115, which may include signaling by or via a satellite 120, a gateway 210, a base station 105, or any combination thereof. In some examples, the duration pattern may be signaled as an explicit configuration of the durations 310, such as an indication of a time gap periodicity 330 (e.g., a value P), a time gap length 340 (e.g., a length in time, a duration, a value L), and a time gap offset 320 (e.g., relative to a reference time 325, a value O). In some examples, one or more (e.g., each) of the periodicity 330, length 340, or the offset 320 may be expressed in one time unit out of multiple time units, or a combination of multiple time units. In various examples, the associated time units may be milliseconds, an OFDM symbol duration of the current numerology (e.g., according to a 30 kHz subcarrier spacing), an OFDM symbol duration of a fixed numerology (e.g., according to a 15 kHz subcarrier spacing), a fraction of a subframe duration (e.g., 1 ms), a subframe duration, or a frame duration. In one example, the periodicity 330 may be given as:

$$P = P1 \times \text{subframe} + P2 \times (\text{OFDM symbol duration of the current numerology}) \quad (1)$$

For determining a time gap, a time gap may start at $(O+k\times P)$ time units, and may end at $(O+k\times P+L)$ time units, where k may be an integer, and the time unit may be an OFDM symbol duration of the current numerology. In various examples, a time gap (e.g., a duration 310) can cover one reference signal transmission or monitoring occasion, or multiple reference signal transmission or monitoring occasions.

Figure 4A:
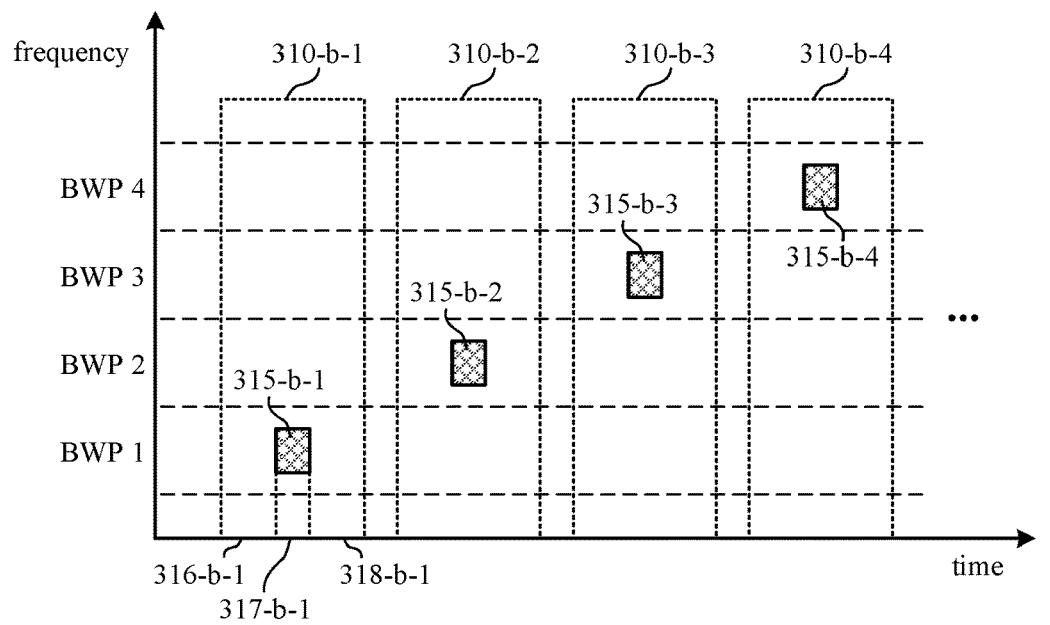
FIGS. 4A and 4B illustrate examples of duration patterns that support beam measurement timing in a wireless communications system in accordance with aspects of the present disclosure.
Figure 4B:
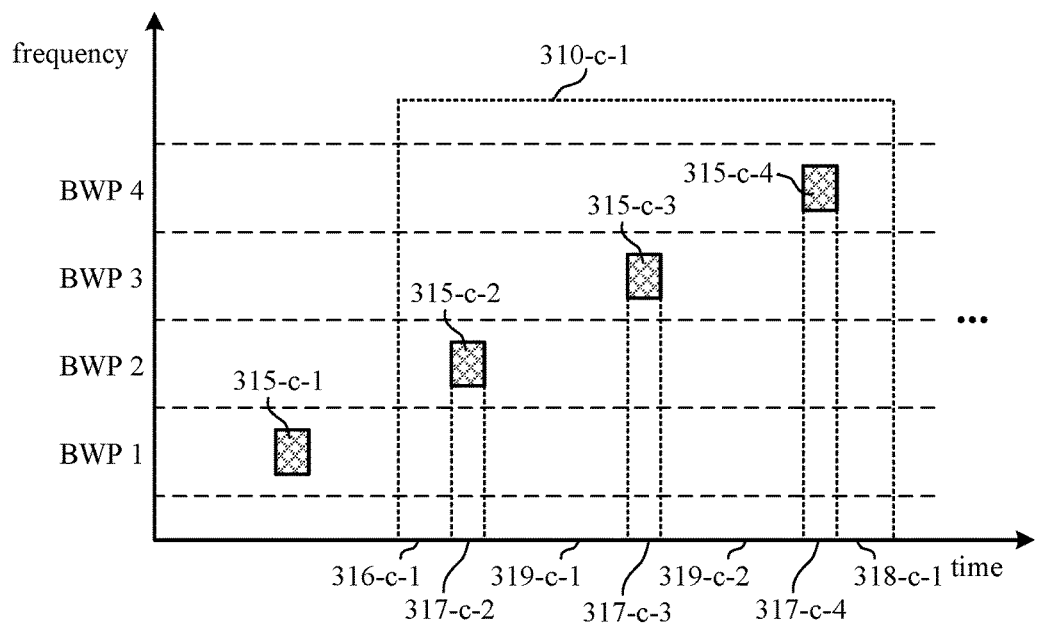

FIGS. 4A and 4B illustrate examples of duration patterns 400 and 450 that support beam measurement timing in a wireless communications system in accordance with aspects of the present disclosure. The duration patterns 400 and 450 may be illustrative of duration patterns that may be employed in the wireless communications system 200 described with reference to FIG. 2, and may include aspects of the duration pattern 300 described with reference to FIG. 3. Each of the duration patterns 400 and 450 may include reference signals 315 associated with beams 230 corresponding to four different bandwidth parts (e.g., BWP 1 through BWP 4). The duration patterns 400 and 450 include one or more durations 310, which may be associated with a duration pattern that may be indicated to a UE 115 in a beam measurement configuration. In some examples, duration pattern 400, duration pattern 450, or both may be configured by way of an explicit indication of the durations 310 (e.g., according to an indicated offset 320, periodicity 330, or length 340, or any combination thereof).

FIG. 4A illustrates an example of a duration pattern 400 that includes a reference signal 315-*b* corresponding to a single beam for each duration 310-*b*, or is otherwise associated with a single bandwidth part during each duration 310-*b*. Each duration 310-*b* may include a first portion 316-*b* (e.g., first portion 316-*b*-1 of duration 310-*b*-1), between the beginning of the duration 310-*b* and a reference signal 315-*b*, during which a UE 115 may perform a retuning operation. Each duration 310-*b* also includes a second portion 317-*b* (e.g., second portion 317-*b*-1 of duration 310-*b*-1), during which the respective reference signal 315-*b* of a beam 230 may be monitored or measured. In some examples, each duration 310-*b* may include a third portion 318-*b* (e.g., third portion 318-*b*-1 of the duration 310-*b*-1), between the reference signal 315-*b* and the end of the duration 310-*b*, during which a UE 115 may perform another retuning operation. In some examples, the duration pattern 400 may be configured by way of an explicit indication of the durations 310 for each of the associated bandwidth parts, or as an aggregate explicit indication for all of the associated bandwidth parts.

FIG. 4B illustrates an example of a duration pattern 450 that includes reference signals 315-*c* corresponding to multiple beams 230 during each duration 310-*c* (e.g., duration 310-*a*-1), or is otherwise associated with multiple bandwidth parts for each duration 310-*c*. Each duration 310-*c* may include a first portion 316-*c* (e.g., first portion 316-*c*-1 of the duration 310-*c*-1), between the beginning of the duration 310-*c* and a first reference signal 315-*c* (e.g., reference signal 315-*c*-2 of the duration 310-*c*-1), during which a UE 115 may perform a retuning operation. Each duration 310-*c* also includes a plurality of second portions 317-*c* (e.g., second portions 317-*c*-2 through 317-*c*-4 of the duration 310-*c*-1), during which the reference signals 315-*c* may be monitored or measured. In some examples, each duration 310-*c* may include a third portion 318-*c* (e.g., third portion 318-*c*-1 of the duration 310-*c*-1), between a last reference signal 315-*c* (e.g., reference signal 315-*c*-4 of the duration 310-*c*-1) and the end of the duration 310-*c*, during which a UE 115 may perform another retuning operation. In some examples, each duration 310-*c* may include one or more fourth portions 319-*c* (e.g., fourth portions 319-*c*-1 and 319-*c*-2), between reference signals 315-*c* (e.g., between reference signals 315-*c*-2 and 315-*c*-3, between reference signals 315-*c*-3 and 315-*c*-4), during which a UE 115 may perform other retuning operations. In some examples, the duration pattern 400 may be configured by way of an explicit indication of the durations 310 for some set of two or more of the associated bandwidth parts.

Figure 5:
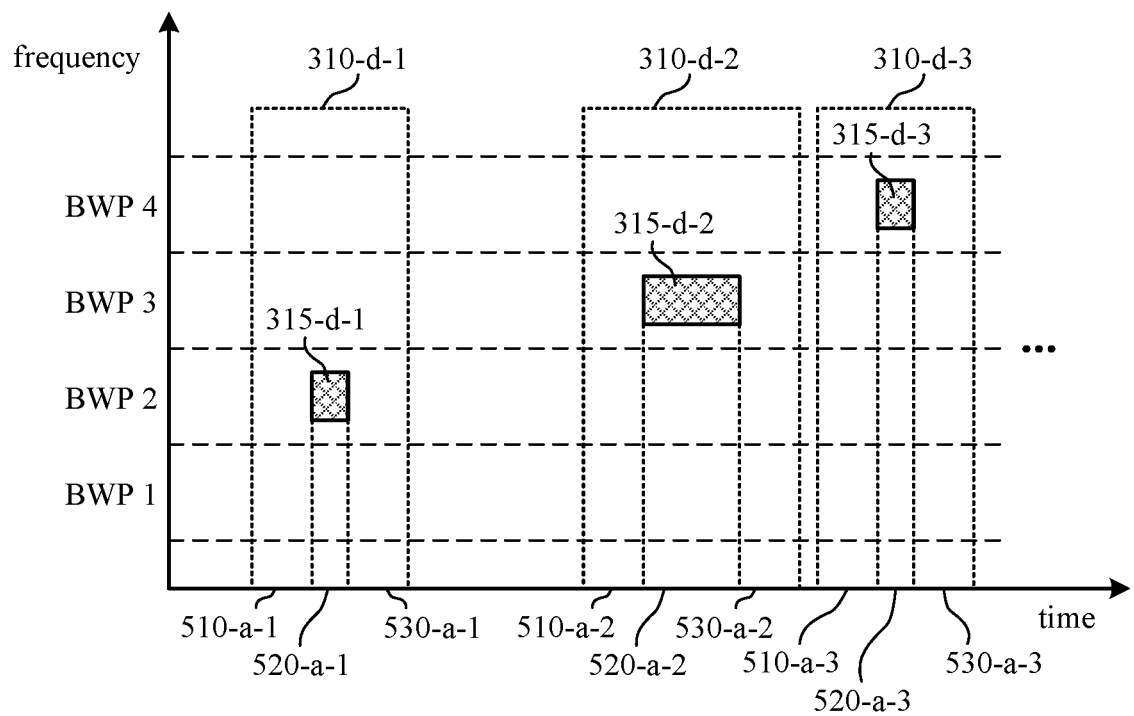
FIG. 5 illustrates an example of a duration pattern that supports beam measurement timing in a wireless communications system in accordance with aspects of the present disclosure.

FIG. 5 illustrates an example of a duration pattern 500 that supports beam measurement timing in a wireless communications system in accordance with aspects of the present disclosure. The duration pattern 500 may be illustrative of duration patterns that may be employed in the wireless communications system 200 described with reference to FIG. 2, and may include aspects of the duration pattern 300 described with reference to FIG. 3. The duration pattern 500 may be associated with four different bandwidth parts (e.g., BWP 1 through BWP 4), and illustrates reference signals 315-*d* in three of the bandwidth parts. The duration pattern 500 includes three durations 310-*d*, which may be associated with a duration pattern that may be indicated to a UE 115 in a beam measurement configuration.

In the example of duration pattern 500, the pattern of durations 310-*d* may be determined based on the reference signals 315-*d* (e.g., SSB or CSI-RS) used for the beam measurements. For example, the network may indicate (e.g., via a satellite 120, via a gateway 210, via a base station 105) intervals 520-*a* (e.g., time intervals, reference signal intervals, reference signal lengths) during which a UE 115 is configured to measure reference signals 315-*d* for the purpose of beam measurement. Relative to the reference signal 315-*d*-1, the network may indicate an interval 520-*a*-1 for monitoring the reference signal 315-*d*-1 on the bandwidth part BWP 2, and so on. For an indicated interval 520-*a*, time gaps may be created to surround the reference signal 315-*d* or interval 520-*a* (e.g., for the purpose of retuning a component of the UE 115). For example, a left gap 510-*a* may be created before the start of the reference signal 315-*d*, and a right gap 530-*a* may be created after the end of the reference signal 315-*d*. As a result, the duration of the respective duration 310-*d* may be determined (e.g., by a UE 115) as the sum of a left gap 510-*a*, an interval 520-*a*, and a right gap 530-*a* (e.g., the duration 310-*d*-1 being the sum of left gap 510-*a*-1, interval 520-*a*-1, and right gap 530-*a*-1).

In some examples, a duration of a left gap 510-*a*, a duration of a right gap 530-*a*, or both may depend on a capability of a UE 115, such as being based on a time involved with the UE 115 retuning its frequency (e.g., to tune a radio of the UE 115 to a different frequency). For example, if a current serving beam is on BWP 1, a duration of the left gap 510-*a*-1 may be determined based at least in part on a duration for retuning the radio from BWP 1 to BWP 2 to monitor the reference signal 315-*d*-1. Additionally or alternatively, a duration of a left gap 510-*a*, a duration of a right gap 530-*a*, or both may depend on a capability or duration to change a beam of the UE 115 (e.g., to change to a different analog or digital receive beam).

Figure 6A:
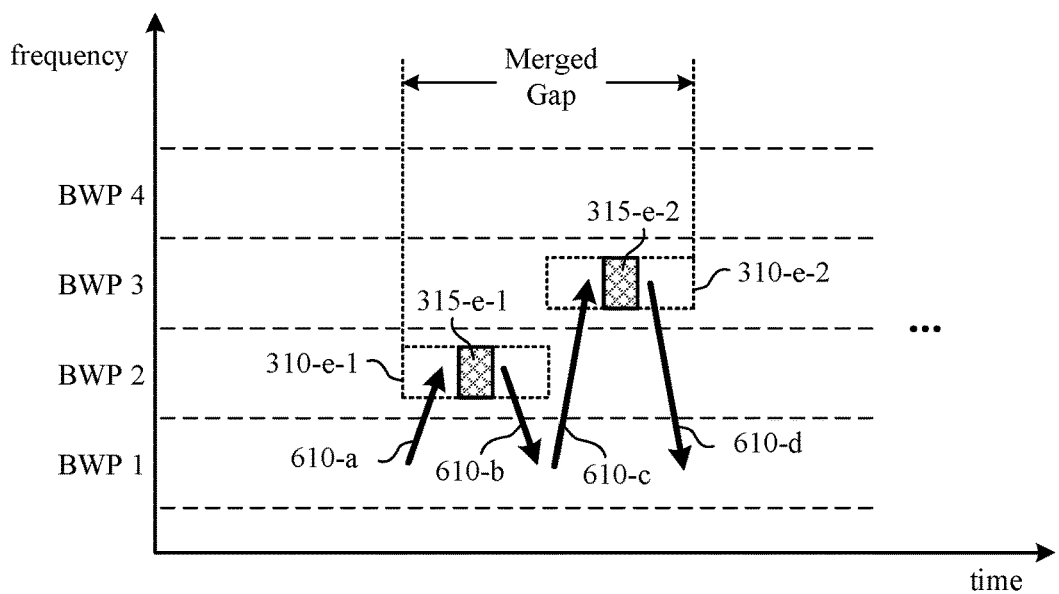
FIGS. 6A and 6B illustrate examples of duration patterns that support beam measurement timing in a wireless communications system in accordance with aspects of the present disclosure.
Figure 6B:
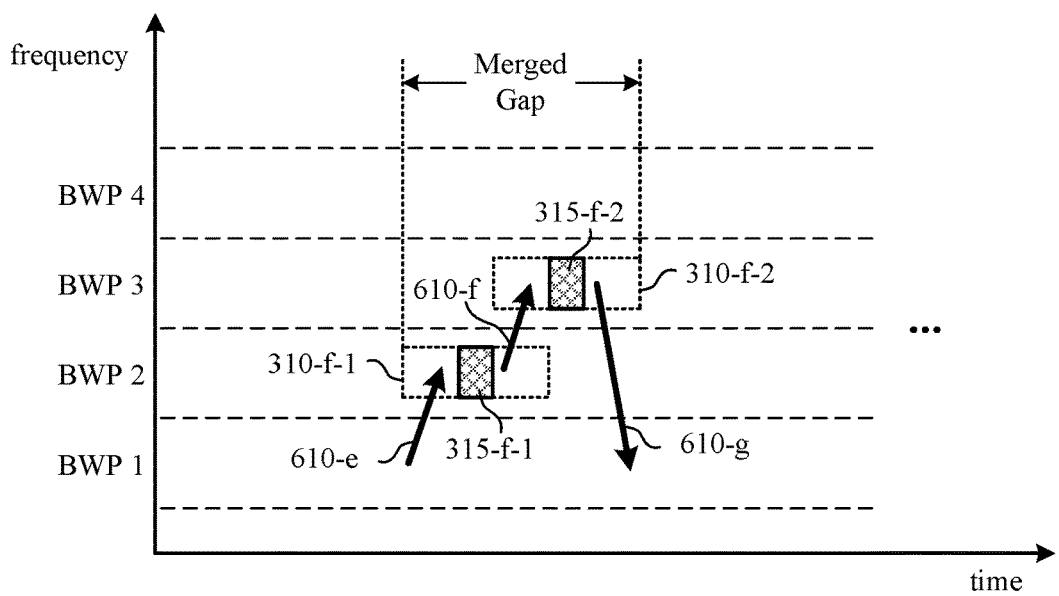

FIGS. 6A and 6B illustrate examples of duration patterns 600 and 650 that support beam measurement timing in a wireless communications system in accordance with aspects of the present disclosure. The duration patterns 600 and 650 may be illustrative of duration patterns that may be employed in the wireless communications system 200 described with reference to FIG. 2, and may include aspects of the duration patterns 300 or 500 described with reference to FIGS. 3 and 5. The duration patterns 600 and 650 include one or more durations 310 for respective reference signals 315, which may be associated with a duration pattern that may be indicated to a UE 115 in a beam measurement configuration.

In some examples, a network may indicate to a UE 115 whether two durations 310 may be merged, which may support shortening durations 310 into a merged gap if the durations 310 are close, connect, or intersect in time. For example, a UE 115 may be operating in BWP 1, corresponding to a first beam 230, and may be configured to monitor a reference signal on a second beam 230 using BWP 2, and monitor a reference signal on a third beam 230 using BWP 3. Thus, the UE 115 may perform a frequency tuning, a beam tuning (e.g., a receive beam tuning), or both to monitor reference signals on the second beam 230 and the third beam 230.

Referring to the duration pattern 600, to support the monitoring of reference signals 315-*e*-1 and 315-*e*-2, which may correspond to the reference signals of the referred-to second beam 230 and third beam 230, the UE 115 may be configured with durations 310-*e*-1 and 310-*e*-2, which are contiguous in the time domain (e.g., where the end of the duration 310-*e*-1 coincides with the beginning of the duration 310-*e*-3). Thus, in some examples, the UE 115 may perform a first tuning operation 610-*a* between BWP 1 and BWP 2 to support monitoring the reference signal 315-*e*-1 in BWP 2. The UE 115 may perform a second tuning operation 610-*b* to return to BWP 1 (e.g., as a default retuning in a configured third portion 318 or identified right gap 530 of the time duration 310-*e*-1). The UE 115 may perform a third tuning operation 610-*c* between BWP 1 and BWP 3 to support monitoring the reference signal 315-*e*-2 in BWP 3, and the UE 115 may perform a fourth tuning operation 610-*d* to again return to BWP 1. Thus, in the example of duration pattern 600, a merged gap duration may be equal to the sum of the duration 310-*e*-1 and the duration 310-*e*-2.

In another example, referring to the duration pattern 650, to support the monitoring of reference signals 315-*e*-1 and 315-*e*-2, which may correspond to the reference signals of the referred-to second beam 230 and third beam 230, the UE 115 may be configured with durations 310*f*-1 and 310-*f*-2, which are overlapping in the time domain (e.g., where an end portion of the duration 310-*e*-1 overlaps in time with a beginning portion of the duration 310-*e*-3). Thus, in some examples, the UE 115 may perform a first tuning operation 610-*e* between BWP 1 and BWP 2 to support monitoring the reference signal 315-*e*-1 in BWP 2. The UE 115 may perform a second tuning operation 610-*f* between BWP 2 and BWP 3 to support monitoring the reference signal 315-*e*-2 in BWP 3, and the UE 115 may perform a third tuning operation 610-*g* to return to BWP 1. Thus, in the example of duration pattern 600, a merged gap duration may be shorter than (e.g., less than) the sum of the duration 310-*f*-1 and the duration 310-*f*-2, and the UE 115 may perform fewer retuning operations to monitor the same quantity of reference signals 315 on different bandwidth parts corresponding to different beams 230. Accordingly, in some examples, a network may favorably configure overlapping durations 310 in accordance with the duration pattern 650 to further improve efficiency related to beam measurement and selection.

Figure 7:
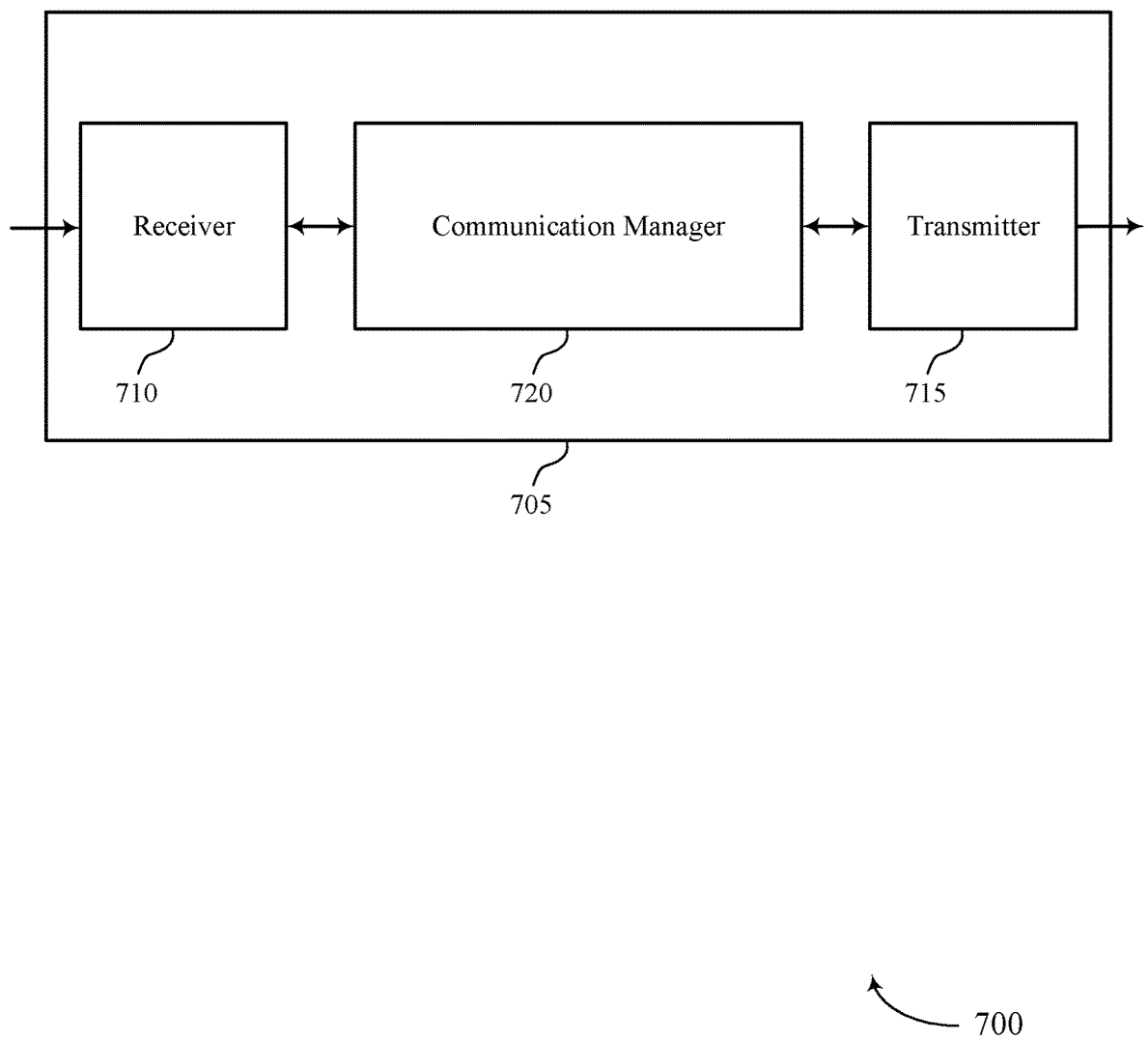
FIGS. 7 and 8 show block diagrams of devices that support beam measurement timing in a wireless communications system in accordance with aspects of the present disclosure.

FIG. 7 shows a block diagram 700 of a device 705 that supports beam measurement timing in a wireless communications system in accordance with aspects of the present disclosure. The device 705 may be an example of aspects of a UE 115 as described herein. The device 705 may include a receiver 710, a transmitter 715, and a communication manager 720. The device 705 may also include a processor. Each of these components may be in communication with one another (e.g., via one or more buses).

The receiver 710 may provide a means for receiving information such as packets, user data, or control information associated with various information channels (e.g., control channels, data channels, information related to beam measurement timing in a wireless communications system). Information may be passed on to other components of the device 705. The receiver 710 may utilize a single antenna or a set of antennas.

The transmitter 715 may provide a means for transmitting signals generated by other components of the device 705. In some examples, the transmitter 715 may be co-located with a receiver 710 in a transceiver module. The transmitter 715 may utilize a single antenna or a set of antennas.

The communication manager 720, the receiver 710, the transmitter 715, or various combinations thereof or various components thereof, may be an example of a means for performing various aspects of beam measurement timing in a wireless communications system as described herein.

In some examples, the communication manager 720, the receiver 710, the transmitter 715, or various combinations thereof or various components thereof, may be implemented in hardware (e.g., in communications management circuitry). The circuitry may include a processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

Additionally or alternatively, the communication manager 720, the receiver 710, the transmitter 715, or various combinations thereof or various components thereof, may be implemented in code (e.g., as communications management software or firmware) executed by a processor. If implemented in code executed by a processor, the functions of the communication manager 720, the receiver 710, the transmitter 715, or various combinations thereof or various components thereof, may be executed by a general-purpose processor, a digital signal processor (DSP), a central processing unit (CPU), an application-specific integrated circuit (ASIC), a field-programmable gate array (FPGA) or other programmable logic device.

In some examples, the communication manager 720 may be configured to perform various operations (e.g., receiving, monitoring, transmitting) using or otherwise in cooperation with the receiver 710, the transmitter 715, or both.

The communication manager 720 may support wireless communication at a UE in accordance with examples as disclosed herein. For example, the communication manager 720 may be configured to provide or support a means for receiving a beam measurement configuration indicating a duration pattern for reference signal monitoring associated with a set of beams and for tuning a radio of the UE for the reference signal monitoring, each beam of the set of beams associated with a respective one of a set of bandwidth parts of a radio frequency spectrum according to a beam frequency mapping. The communication manager 720 may be configured to provide or support a means for monitoring, based at least in part on the duration pattern indicated by the beam measurement configuration, a reference signal in a bandwidth part of the set of bandwidth parts that is associated with a beam of the set of beams according to the beam frequency mapping. The communication manager 720 may be configured to provide or support a means for determining, based on the monitoring of the reference signal in the bandwidth part, a channel quality metric for the beam. The communication manager 720 may be configured to provide or support a means for performing communications based on the determined channel quality metric for the beam.

By including or configuring the communication manager 720 in accordance with examples as described herein, the device 705 may support improved techniques for beam measurement and mobility in a wireless communications system. For example, by supporting an indicated duration pattern for beam monitoring that includes both a measurement duration (e.g., a duration for measuring or receiving reference signals corresponding to a beam) and one or more retuning durations (e.g., gap durations), the device 705 may support improved flexibility and responsiveness for maintaining a communication link using different beams 230 that are associated with different bandwidth parts. For example, the communication manager 720 may enable faster, more efficient, or more flexible beam selection in a system that associates respective beams with different bandwidth parts of a radio frequency spectrum, among other benefits. Such improvements may be particularly beneficial in high mobility scenarios, such as a non-terrestrial network, where movement of a transmitting device (e.g., a satellite), a receiving device (e.g., the device 705), or both may involve relatively frequent reselection of beams and corresponding bandwidth parts to maintain a communication link.

Figure 8:
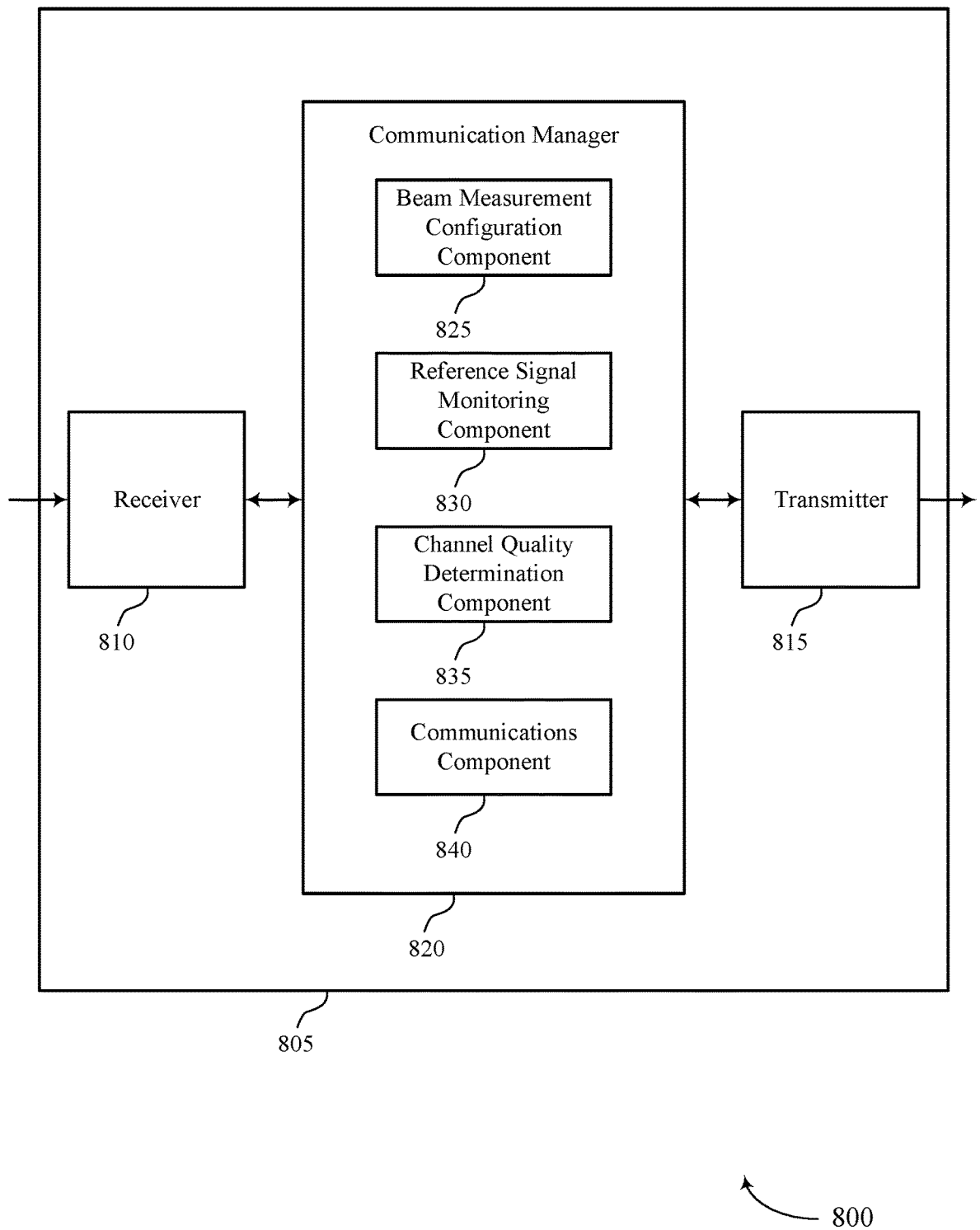

FIG. 8 shows a block diagram 800 of a device 805 that supports beam measurement timing in a wireless communications system in accordance with aspects of the present disclosure. The device 805 may be an example of aspects of a device 705 or a UE 115 as described herein. The device 805 may include a receiver 810, a transmitter 815, and a communication manager 820. The device 805 may also include a processor. Each of these components may be in communication with one another (e.g., via one or more buses).

The receiver 810 may provide a means for receiving information such as packets, user data, or control information associated with various information channels (e.g., control channels, data channels, information related to beam measurement timing in a wireless communications system). Information may be passed on to other components of the device 805. The receiver 810 may utilize a single antenna or a set of antennas.

The transmitter 815 may provide a means for transmitting signals generated by other components of the device 805. In some examples, the transmitter 815 may be co-located with a receiver 810 in a transceiver module. The transmitter 815 may utilize a single antenna or a set of antennas.

The device 805, or various components thereof, may be an example of means for performing various aspects of beam measurement timing in a wireless communications system as described herein. For example, the communication manager 820 may include a beam measurement configuration component 825, a reference signal monitoring component 830, a channel quality determination component 835, a communications component 840, or any combination thereof. The communication manager 820 may be an example of aspects of a communication manager 720 as described herein. In some examples, the communication manager 820, or various components thereof, may be configured to perform various operations (e.g., receiving, monitoring, transmitting) using or otherwise in cooperation with the receiver 810, the transmitter 815, or both.

The communication manager 820 may support wireless communication at a UE in accordance with examples as disclosed herein. The beam measurement configuration component 825 may be configured to provide or support a means for receiving a beam measurement configuration indicating a duration pattern for reference signal monitoring associated with a set of beams and for tuning a radio of the UE for the reference signal monitoring, each beam of the set of beams associated with a respective one of a set of bandwidth parts of a radio frequency spectrum according to a beam frequency mapping. The reference signal monitoring component 830 may be configured to provide or support a means for monitoring, based on the duration pattern indicated by the beam measurement configuration, a reference signal in a bandwidth part of the set of bandwidth parts that is associated with a beam of the set of beams according to the beam frequency mapping. The channel quality determination component 835 may be configured to provide or support a means for determining, based on the monitoring of the reference signal in the bandwidth part, a channel quality metric for the beam. The communications component 840 may be configured to provide or support a means for performing communications based on the determined channel quality metric for the beam.

Figure 9:
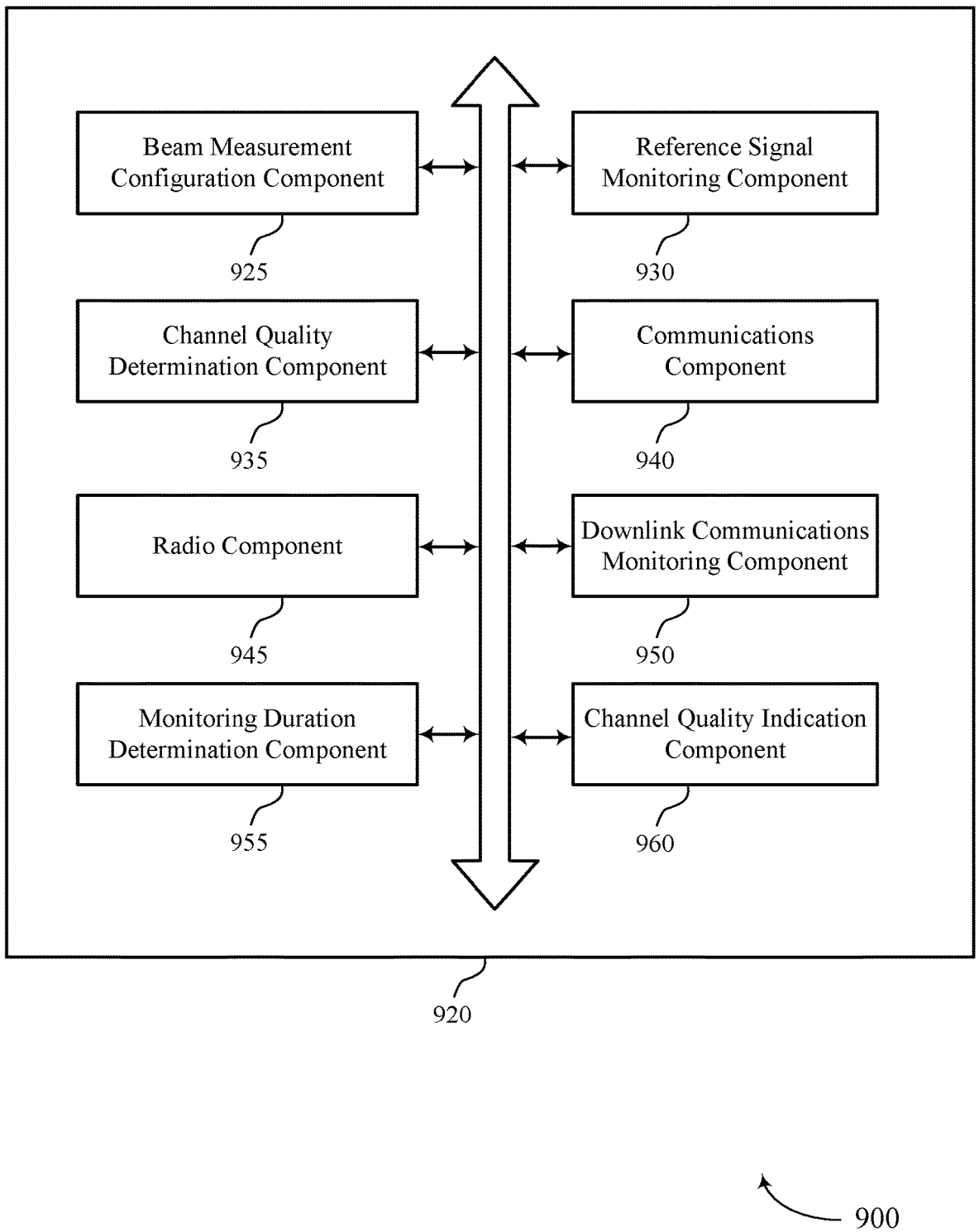
FIG. 9 shows a block diagram of a communication manager that supports beam measurement timing in a wireless communications system in accordance with aspects of the present disclosure.

FIG. 9 shows a block diagram 900 of a communication manager 920 that supports beam measurement timing in a wireless communications system in accordance with aspects of the present disclosure. The communication manager 920 may be an example of aspects of a communication manager 720, a communication manager 820, or both, as described herein. The communication manager 920, or various components thereof, may be an example of means for performing various aspects of beam measurement timing in a wireless communications system as described herein. For example, the communication manager 920 may include a beam measurement configuration component 925, a reference signal monitoring component 930, a channel quality determination component 935, a communications component 940, a radio component 945, a downlink communications monitoring component 950, a monitoring duration determination component 955, and a channel quality indication component 960. Each of these components may communicate, directly or indirectly, with one another (e.g., via one or more buses).

The communication manager 920 may support wireless communication at a UE in accordance with examples as disclosed herein. The beam measurement configuration component 925 may be configured to provide or support a means for receiving a beam measurement configuration indicating a duration pattern for reference signal monitoring associated with a set of beams and for tuning a radio of the UE for the reference signal monitoring, each beam of the set of beams associated with a respective one of a set of bandwidth parts of a radio frequency spectrum according to a beam frequency mapping. The reference signal monitoring component 930 may be configured to provide or support a means for monitoring, based on the duration pattern indicated by the beam measurement configuration, a reference signal in a bandwidth part of the set of bandwidth parts that is associated with a beam of the set of beams according to the beam frequency mapping. The channel quality determination component 935 may be configured to provide or support a means for determining, based on the monitoring of the reference signal in the bandwidth part, a channel quality metric for the beam. The communications component 940 may be configured to provide or support a means for performing communications based on the determined channel quality metric for the beam.

In some examples, for the monitoring, the radio component 945 may be configured to provide or support a means for tuning the radio of the UE, during a first portion of a duration of the indicated duration pattern, from a second bandwidth part to the bandwidth part that is associated with the beam. In some examples, for the monitoring, the reference signal monitoring component 930 may be configured to provide or support a means for monitoring the reference signal, during a second portion of the duration after the first portion, in the bandwidth part that is associated with the beam.

In some examples, for the monitoring, the radio component 945 may be configured to provide or support a means for tuning the radio of the UE, during a third portion of the duration after the second portion, from the bandwidth part associated with the beam to the second bandwidth part.

In some examples, the monitoring duration determination component 955 may be configured to provide or support a means for determining the first portion of the duration, the third portion of the duration, or both based on the beam measurement configuration and an indicated reference signal pattern.

In some examples, the monitoring duration determination component 955 may be configured to provide or support a means for determining the first portion of the duration, the third portion of the duration, or both based on a tuning capability of the UE.

In some examples, for the monitoring, the monitoring duration determination component 955 may be configured to provide or support a means for identifying that the duration overlaps with a second duration of the indicated duration pattern during an overlap duration that follows the second portion of the duration. In some examples, for the monitoring, the radio component 945 may be configured to provide or support a means for tuning the radio of the UE, during the overlap duration, from the bandwidth part associated with the beam to a third bandwidth part of the set of bandwidth parts that is associated with a second beam according to the beam frequency mapping. In some examples, for the monitoring, the reference signal monitoring component 930 may be configured to provide or support a means for monitoring a second reference signal in the third bandwidth part that is associated with the second beam during the second duration.

In some examples, for the monitoring, the reference signal monitoring component 930 may be configured to provide or support a means for monitoring, during a first duration of the indicated duration pattern, the reference signal in the bandwidth part associated with the beam. In some examples, for the monitoring, the reference signal monitoring component 930 may be configured to provide or support a means for monitoring, during a second duration of the indicated duration pattern, a second reference signal in a second bandwidth part of the set of bandwidth parts that is associated with a second beam of the set of beams according to the beam frequency mapping.

In some examples, for the monitoring, the reference signal monitoring component 930 may be configured to provide or support a means for monitoring, during a duration of the indicated duration pattern, the reference signal in the bandwidth part associated with the beam. In some examples, for the monitoring, the reference signal monitoring component 930 may be configured to provide or support a means for monitoring, during the duration of the indicated duration pattern, a second reference signal in a second bandwidth part of the set of bandwidth parts that is associated with a second beam of the set of beams according to the beam frequency mapping.

In some examples, the downlink communications monitoring component 950 may be configured to provide or support a means for refraining from monitoring for downlink data transmissions or downlink control transmissions during durations of the indicated duration pattern.

In some examples, the beam measurement configuration may include an indication of a periodicity, a length of time, a time offset, or any combination thereof for durations of the duration pattern.

In some examples, the monitoring duration determination component 955 may be configured to provide or support a means for determining, for a duration of the indicated duration pattern and based on an indication of a reference signal pattern, a first portion of the duration for the monitoring of the reference signal. In some examples, the monitoring duration determination component 955 may be configured to provide or support a means for determining, for the duration of the indicated duration pattern and based on the beam measurement configuration, a second portion of the duration before the first portion for retuning the radio of the UE.

In some examples, the reference signal pattern may include a channel state information reference signal pattern or a synchronization signal block pattern, or a combination thereof.

In some examples, to perform the communications, the channel quality indication component 960 may be configured to provide or support a means for transmitting an indication of the channel quality metric for the beam.

In some examples, to the receive the beam measurement configuration, the beam measurement configuration component 925 may be configured to provide or support a means for receiving the beam measurement configuration from a node of a non-terrestrial network.

In some examples, to the monitoring, the reference signal monitoring component 930 may be configured to provide or support a means for monitoring beam transmissions of a node of a non-terrestrial network.

Figure 10:
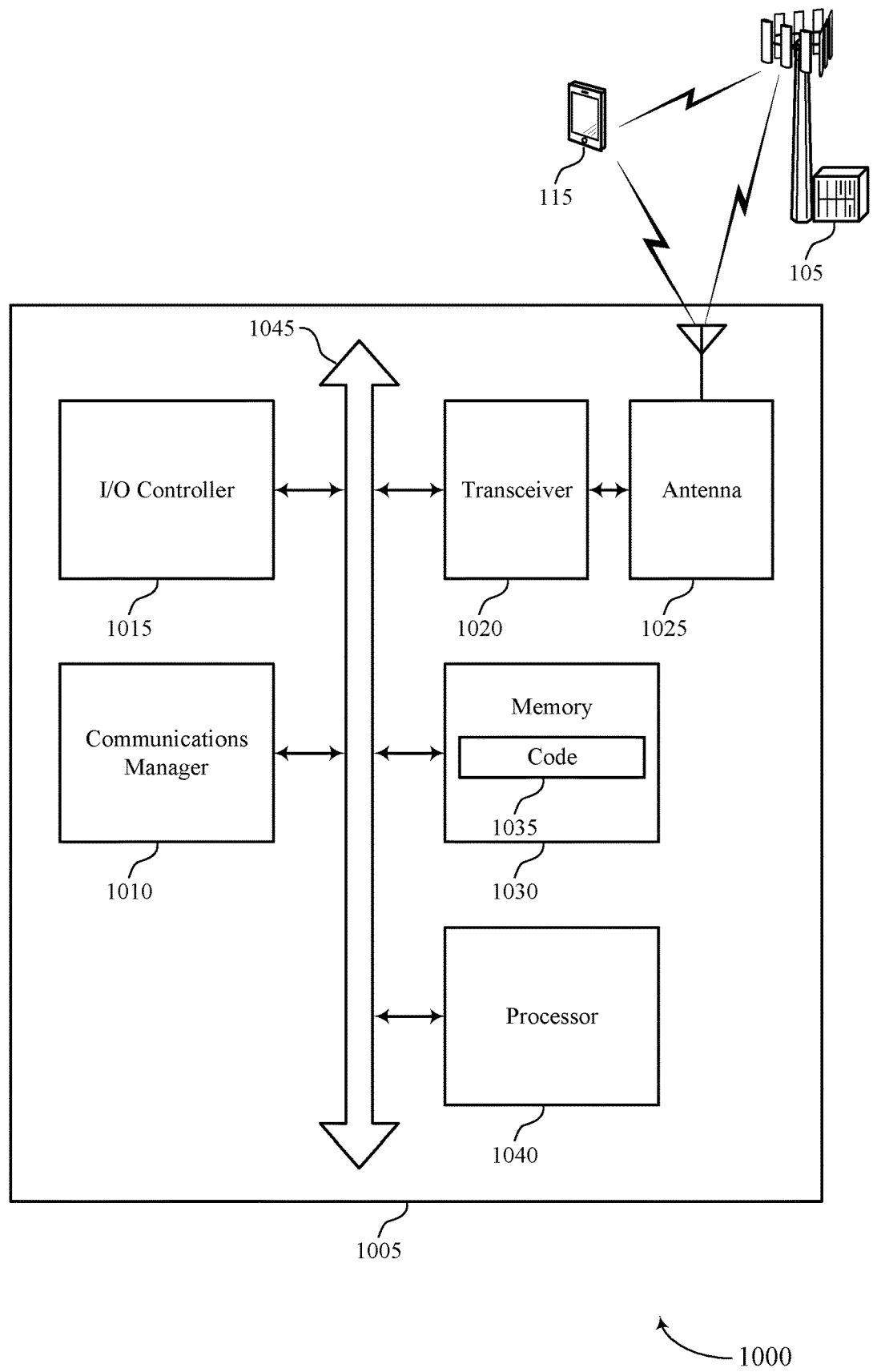
FIG. 10 shows a diagram of a system including a device that supports beam measurement timing in a wireless communications system in accordance with aspects of the present disclosure.

FIG. 10 shows a diagram of a system 1000 including a device 1005 that supports beam measurement timing in a wireless communications system in accordance with aspects of the present disclosure. The device 1005 may be an example of or include the components of device 705, device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, including a communication manager 1010, a I/O controller 1015, a transceiver 1020, an antenna 1025, a memory 1030, a code 1035, and a processor 1040. These components may be in electronic communication or otherwise coupled (e.g., operatively, communicatively, functionally, electronically, electrically) via one or more buses (e.g., bus 1045).

The I/O controller 1015 may manage input and output signals for device 1005. The I/O controller 1015 may also manage peripherals not integrated into device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with device 1005 via the I/O controller 1015 or via hardware components controlled by the I/O controller 1015.

In some cases, the device 1005 may include a single antenna 1025. However, in some cases the device may have more than one antenna 1025, which may be capable of concurrently transmitting or receiving multiple wireless transmissions. The transceiver 1020 may communicate bi-directionally, via the one or more antennas 1025, wired, or wireless links as described herein. For example, the transceiver 1020 may represent a wireless transceiver and may communicate bi-directionally with another wireless transceiver. The transceiver 1020 may also include a modem to modulate the packets and provide the modulated packets to one or more antennas 1025 for transmission, and to demodulate packets received from the one or more antennas 1025. The transceiver 1020, or the transceiver 1020 and one or more antennas 1025, may be an example of a transmitter 715, a transmitter 815, a receiver 710, a receiver 810, or any combination thereof or component thereof, as described herein.

The memory 1030 may include random-access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein. In some cases, the memory 1030 may contain, among other things, a basic input/output system (BIOS) which may control basic hardware or software operation such as the interaction with peripheral components or devices.

The processor 1040 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting beam measurement timing in a wireless communications system).

The communication manager 1010 may support wireless communication at a UE in accordance with examples as disclosed herein. For example, the communication manager 1010 may be configured to provide or support a means for receiving a beam measurement configuration indicating a duration pattern for reference signal monitoring associated with a set of beams and for tuning a radio of the UE for the reference signal monitoring, each beam of the set of beams associated with a respective one of a set of bandwidth parts of a radio frequency spectrum according to a beam frequency mapping. The communication manager 1010 may be configured to provide or support a means for monitoring, based at least in part on the duration pattern indicated by the beam measurement configuration, a reference signal in a bandwidth part of the set of bandwidth parts that is associated with a beam of the set of beams according to the beam frequency mapping. The communication manager 1010 may be configured to provide or support a means for determining, based on the monitoring of the reference signal in the bandwidth part, a channel quality metric for the beam. The communication manager 1010 may be configured to provide or support a means for performing communications based on the determined channel quality metric for the beam.

By including or configuring the communication manager 1010 in accordance with examples as described herein, the device 1005 may support improved techniques for beam measurement and mobility in a wireless communications system. For example, by supporting an indicated duration pattern for beam monitoring that includes both a measurement duration (e.g., a duration for measuring or receiving reference signals corresponding to a beam) and one or more retuning durations (e.g., gap durations), the device 1005 may support improved flexibility and responsiveness for maintaining a communication link using different beams 230 that are associated with different bandwidth parts. For example, the communication manager 1010 may enable faster, more efficient, or more flexible beam selection in a system that associates respective beams with different bandwidth parts of a radio frequency spectrum, among other benefits. Such improvements may be particularly beneficial in high mobility scenarios, such as a non-terrestrial network, where movement of a transmitting device (e.g., a satellite), a receiving device (e.g., the device 1005), or both may involve relatively frequent reselection of beams and corresponding bandwidth parts to maintain a communication link. Accordingly, including the communication manager 1010 may improve a user experience associated with the device 1005 by supporting more reliable, more flexible, or more diverse techniques for maintaining a communication link.

In some examples, the communication manager 1010 may be configured to perform various operations (e.g., receiving, monitoring, transmitting) using or otherwise in cooperation with the transceiver 1020, the one or more antennas 1025, or any combination thereof. Although the communication manager 1010 is illustrated as a separate component, in some examples, one or more functions described with reference to the communication manager 1010 may be supported by or performed by the processor 1040, the memory 1030, the code 1035, or any combination thereof. For example, the code 1035 may include instructions executable by the processor 1040 to cause the device 1005 to perform various aspects of beam measurement timing in a wireless communications system as described herein, or the processor 1040 and the memory 1030 may be otherwise configured to perform or support such operations.

Figure 11:
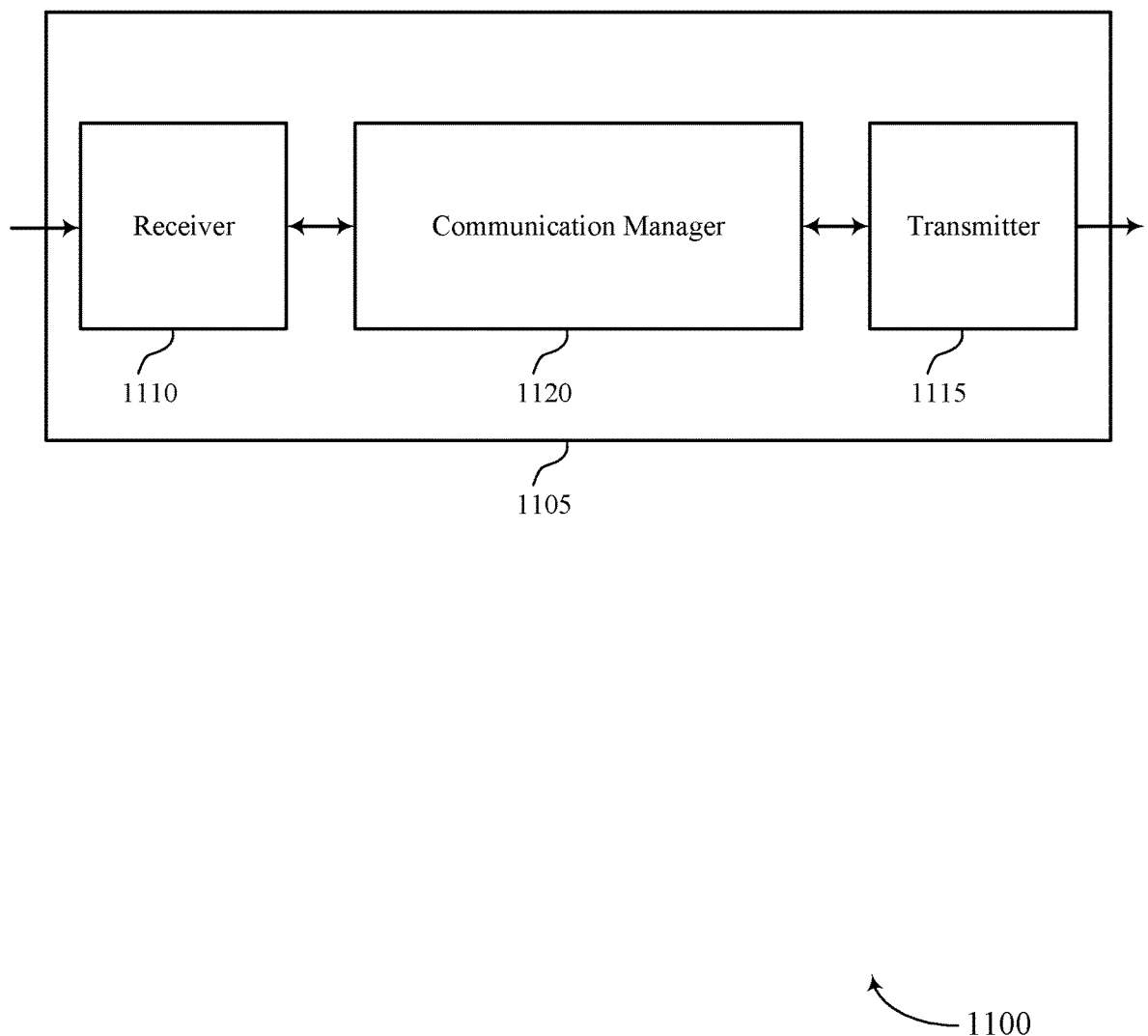
FIGS. 11 and 12 show block diagrams of devices that support beam measurement timing in a wireless communications system in accordance with aspects of the present disclosure.

FIG. 11 shows a block diagram 1100 of a device 1105 that supports beam measurement timing in a wireless communications system in accordance with aspects of the present disclosure. In various examples, the device 1105 may be an example of aspects of a satellite 120, a gateway 210, a combination of a satellite 120 and a gateway 210, or a base station 105 as described herein. The device 1105 may include a receiver 1110, a transmitter 1115, and a communication manager 1120. The device 1105 may also include a processor. Each of these components may be in communication with one another (e.g., via one or more buses).

The receiver 1110 may provide a means for receiving information such as packets, user data, or control information associated with various information channels (e.g., control channels, data channels, information related to beam measurement timing in a wireless communications system). Information may be passed on to other components of the device 1105. The receiver 1110 may utilize a single antenna or a set of antennas.

The transmitter 1115 may provide a means for transmitting signals generated by other components of the device 1105. In some examples, the transmitter 1115 may be co-located with a receiver 1110 in a transceiver module. The transmitter 1115 may utilize a single antenna or a set of antennas.

The communication manager 1120, the receiver 1110, the transmitter 1115, or various combinations thereof or various components thereof, may be an example of a means for performing various aspects of beam measurement timing in a wireless communications system as described herein.

In some examples, the communication manager 1120, the receiver 1110, the transmitter 1115, or various combinations thereof or various components thereof, may be implemented in hardware (e.g., in communications management circuitry). The circuitry may include a processor, a DSP, a CPU, an ASIC, an FPGA or other programmable logic device, discrete gate or transistor logic, discrete hardware components, or any combination thereof designed to perform the functions described in the present disclosure.

Additionally or alternatively, the communication manager 1120, the receiver 1110, the transmitter 1115, or various combinations thereof or various components thereof, may be implemented in code (e.g., as communications management software or firmware) executed by a processor. If implemented in code executed by a processor, the functions of the communication manager 1120, the receiver 1110, the transmitter 1115, or various combinations thereof or various components thereof, may be executed by a general-purpose processor, a DSP, a CPU, an ASIC, an FPGA or other programmable logic device.

In some examples, the communication manager 1120 may be configured to perform various operations (e.g., receiving, monitoring, transmitting) using or otherwise in cooperation with the receiver 1110, the transmitter 1115, or both.

The communication manager 1120 may support wireless communication at a node of a non-terrestrial network in accordance with examples as disclosed herein. For example, the communication manager 1120 may be configured to provide or support a means for transmitting a beam measurement configuration indicating a duration pattern for reference signal monitoring associated with a set of beams and for tuning a radio of the UE for the reference signal monitoring, each beam of the set of beams associated with a respective one of a set of bandwidth parts of a radio frequency spectrum according to a beam frequency mapping. The communication manager 1120 may be configured to provide or support a means for transmitting, based on the duration pattern indicated by the beam measurement configuration, reference signals for the set of beams, where the transmitting of the reference signals includes transmitting the respective reference signal for each beam of the set of beams using the respective bandwidth part associated with each beam according to the beam frequency mapping.

By including or configuring the communication manager 1120 in accordance with examples as described herein, the device 1105 may support improved techniques for beam measurement and mobility in a wireless communications system. For example, by indicating duration patterns for beam monitoring that include both a measurement duration (e.g., a duration for measuring or receiving reference signals corresponding to a beam) and one or more retuning durations (e.g., gap durations), the device 1105 may support improved flexibility and responsiveness for maintaining a communication link with UEs 115 using different beams 230 that are associated with different bandwidth parts. For example, the communication manager 1120 may enable faster, more efficient, or more flexible beam selection in a system that associates respective beams with different bandwidth parts of a radio frequency spectrum, among other benefits. Such improvements may be particularly beneficial in high mobility scenarios, such as a non-terrestrial network, where movement of a transmitting device (e.g., the device 1105), a receiving device (e.g., a UE 115), or both may involve relatively frequent reselection of beams and corresponding bandwidth parts to maintain a communication link.

Figure 12:
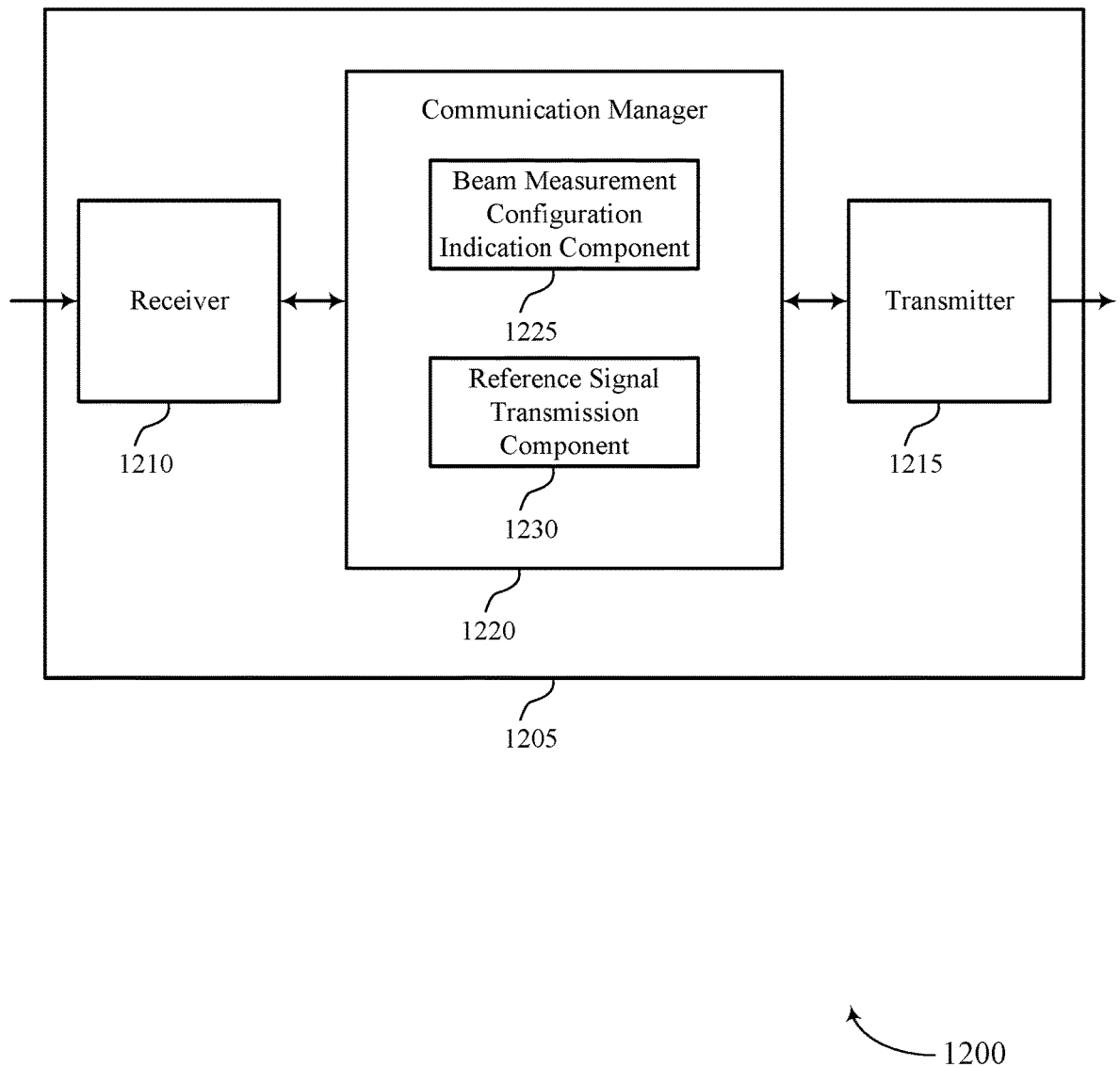

FIG. 12 shows a block diagram 1200 of a device 1205 that supports beam measurement timing in a wireless communications system in accordance with aspects of the present disclosure. In various examples, the device 1205 may be an example of aspects of a device 1105, a satellite 120, a gateway 210, a combination of a satellite 120 and a gateway 210, or a base station 105 as described herein. The device 1205 may include a receiver 1210, a transmitter 1215, and a communication manager 1220. The device 1205 may also include a processor. Each of these components may be in communication with one another (e.g., via one or more buses).

The receiver 1210 may provide a means for receiving information such as packets, user data, or control information associated with various information channels (e.g., control channels, data channels, information related to beam measurement timing in a wireless communications system). Information may be passed on to other components of the device 1205. The receiver 1210 may utilize a single antenna or a set of antennas.

The transmitter 1215 may provide a means for transmitting signals generated by other components of the device 1205. In some examples, the transmitter 1215 may be co-located with a receiver 1210 in a transceiver module. The transmitter 1215 may utilize a single antenna or a set of antennas.

The device 1205, or various components thereof, may be an example of means for performing various aspects of beam measurement timing in a wireless communications system as described herein. For example, the communication manager 1220 may include a beam measurement configuration indication component 1225 a reference signal transmission component 1230, or any combination thereof. The communication manager 1220 may be an example of aspects of a communication manager 1120 as described herein. In some examples, the communication manager 1220, or various components thereof, may be configured to perform various operations (e.g., receiving, monitoring, transmitting) using or otherwise in cooperation with the receiver 1210, the transmitter 1215, or both.

The communication manager 1220 may support wireless communication at a node of a non-terrestrial network in accordance with examples as disclosed herein. The beam measurement configuration indication component 1225 may be configured to provide or support a means for transmitting a beam measurement configuration indicating a duration pattern for reference signal monitoring associated with a set of beams and for tuning a radio of the UE for the reference signal monitoring, each beam of the set of beams associated with a respective one of a set of bandwidth parts of a radio frequency spectrum according to a beam frequency mapping. The reference signal transmission component 1230 may be configured to provide or support a means for transmitting, based on the duration pattern indicated by the beam measurement configuration, reference signals for the set of beams, where the transmitting of the reference signals includes transmitting the respective reference signal for each beam of the set of beams using the respective bandwidth part associated with each beam according to the beam frequency mapping.

Figure 13:
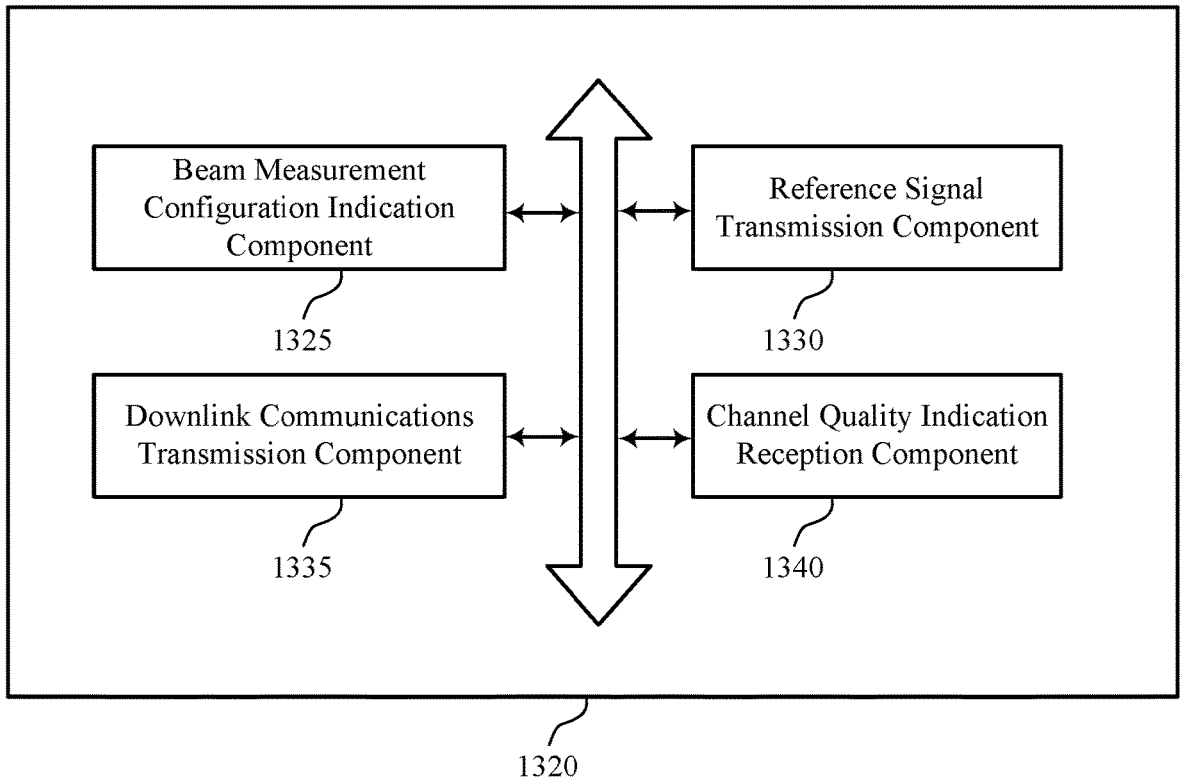
FIG. 13 shows a block diagram of a communication manager that supports beam measurement timing in a wireless communications system in accordance with aspects of the present disclosure.

FIG. 13 shows a block diagram 1300 of a communication manager 1320 that supports beam measurement timing in a wireless communications system in accordance with aspects of the present disclosure. The communication manager 1320 may be an example of aspects of a communication manager 1120, a communication manager 1220, or both, as described herein. The communication manager 1320, or various components thereof, may be an example of means for performing various aspects of beam measurement timing in a wireless communications system as described herein. For example, the communication manager 1320 may include a beam measurement configuration indication component 1325, a reference signal transmission component 1330, a downlink communications transmission component 1335, a channel quality indication reception component 1340, or any combination thereof. Each of these components may communicate, directly or indirectly, with one another (e.g., via one or more buses).

The communication manager 1320 may support wireless communication at a node of a non-terrestrial network in accordance with examples as disclosed herein. The beam measurement configuration indication component 1325 may be configured to provide or support a means for transmitting a beam measurement configuration indicating a duration pattern for reference signal monitoring associated with a set of beams and for tuning a radio of the UE for the reference signal monitoring, each beam of the set of beams associated with a respective one of a set of bandwidth parts of a radio frequency spectrum according to a beam frequency mapping. The reference signal transmission component 1330 may be configured to provide or support a means for transmitting, based on the duration pattern indicated by the beam measurement configuration, reference signals for the set of beams, where the transmitting of the reference signals includes transmitting the respective reference signal for each beam of the set of beams using the respective bandwidth part associated with each beam according to the beam frequency mapping.

In some examples, to transmit the reference signals, the reference signal transmission component 1330 may be configured to provide or support a means for refraining from transmitting the reference signals during a first portion of a duration of the indicated duration pattern. In some examples, to the transmit of the reference signals, the reference signal transmission component 1330 may be configured to provide or support a means for transmitting a reference signal during a second portion of the duration after the first portion.

In some examples, to transmit the reference signals, the reference signal transmission component 1330 may be configured to provide or support a means for refraining from transmitting the reference signals during a third portion of the duration after the second portion.

In some examples, to transmit the reference signals, the reference signal transmission component 1330 may be configured to provide or support a means for refraining from transmitting the reference signals after the second portion of the duration and during an overlap of the duration and a second duration of the indicated duration pattern.

In some examples, to transmit the reference signals, the reference signal transmission component 1330 may be configured to provide or support a means for transmitting, during a first duration of the indicated duration pattern, a first reference signal for a first beam of the set of beams using a first bandwidth part of the set of bandwidth parts associated with the first beam according to the beam frequency mapping. In some examples, to transmit the reference signals, the reference signal transmission component 1330 may be configured to provide or support a means for transmitting, during a second duration of the indicated duration pattern, a second reference signal for a second beam of the set of beams using a second bandwidth part of the set of bandwidth parts, different than the first bandwidth part, associated with the second beam according to the beam frequency mapping.

In some examples, to transmit the reference signals, the reference signal transmission component 1330 may be configured to provide or support a means for transmitting, during a duration of the indicated duration pattern, a first reference signal for a first beam of the set of beams using a first bandwidth part associated with the first beam according to the beam frequency mapping, and a second reference signal for a second beam of the set of beams using a second bandwidth part, different than the first bandwidth part, associated with the second beam according to the beam frequency mapping.

In some examples, the downlink communications transmission component 1335 may be configured to provide or support a means for refraining from transmitting downlink data transmissions or downlink control transmissions during durations of the indicated duration pattern.

In some examples, the beam measurement configuration may include an indication of a periodicity, a length of time, a time offset, or any combination thereof associated with the duration pattern.

In some examples, the beam measurement configuration may include an indication to determine one or more gap portions, for retuning operations during durations of the duration pattern, based on an indicated reference signal pattern.

In some examples, the indicated reference signal pattern includes a channel state information reference signal pattern, or a synchronization signal block pattern, or a combination thereof.

In some examples, the channel quality indication reception component 1340 may be configured to provide or support a means for receiving, from a UE, an indication of a channel quality metric determined by the UE for one or more of the set of beams.

Figure 14:
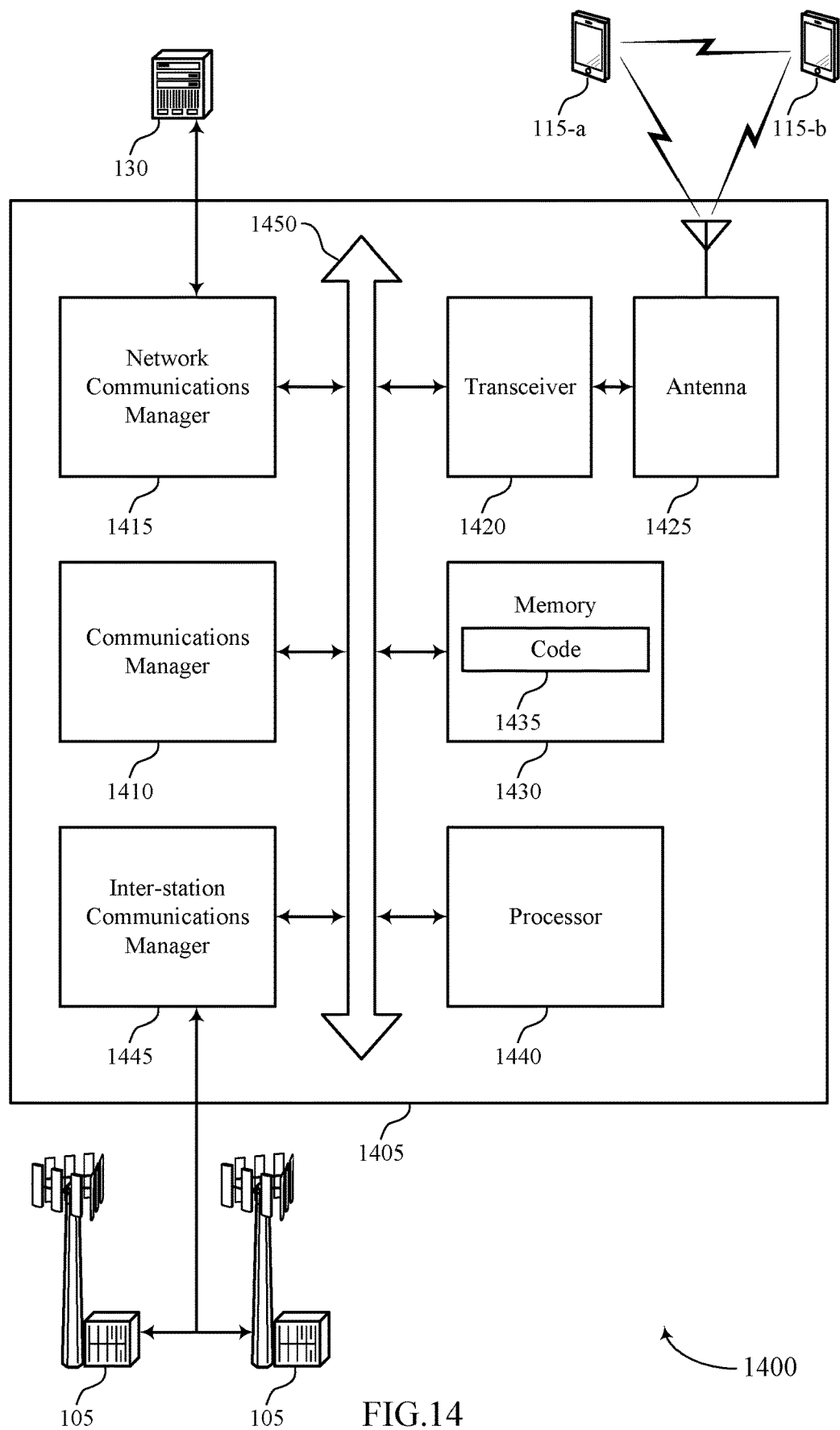
FIG. 14 shows a diagram of a system including a device that supports beam measurement timing in a wireless communications system in accordance with aspects of the present disclosure.

FIG. 14 shows a diagram of a system 1400 including a device 1405 that supports beam measurement timing in a wireless communications system in accordance with aspects of the present disclosure. The device 1405 may be an example of or include the components of device 1105, device 1205, a satellite 120, a gateway 210, a combination of a satellite 120 and a gateway 210, or a base station 105 as described herein. The device 1405 may communicate wirelessly with one or more base stations 105, UEs 115, or any combination thereof. The device 1405 may include components for bi-directional voice and data communications including components for transmitting and receiving communications, including a communication manager 1410, a network communications manager 1415, a transceiver 1420, an antenna 1425, a memory 1430, a code 1435, a processor 1440, and an inter-station communications manager 1445. These components may be in electronic communication or otherwise coupled (e.g., operatively, communicatively, functionally, electronically, electrically) via one or more buses (e.g., bus 1450).

The network communications manager 1415 may manage communications with the core network (e.g., via one or more wired backhaul links). For example, the network communications manager 1415 may manage the transfer of data communications for client devices, such as one or more UEs 115.

In some cases, the device 1405 may include a single antenna 1425. However, in some cases the device may have more than one antenna 1425, which may be capable of concurrently transmitting or receiving multiple wireless transmissions. The transceiver 1420 may communicate bi-directionally, via the one or more antennas 1425, wired, or wireless links as described herein. For example, the transceiver 1420 may represent a wireless transceiver and may communicate bi-directionally with another wireless transceiver. The transceiver 1420 may also include a modem to modulate the packets and provide the modulated packets to one or more antennas 1425 for transmission, and to demodulate packets received from the one or more antennas 1425. The transceiver 1420, or the transceiver 1420 and one or more antennas 1425, may be an example of a transmitter 1115, a transmitter 1215, a receiver 1110, a receiver 1210, or any combination thereof or component thereof, as described herein.

The memory 1430 may include random-access memory (RAM) and read-only memory (ROM). The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1440 may be configured to operate a memory array using a memory controller. In other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting beam measurement timing in a wireless communications system).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The communication manager 1410 may support wireless communication (e.g., at a node of a non-terrestrial network) in accordance with examples as disclosed herein. For example, the communication manager 1410 may be configured to provide or support a means for transmitting a beam measurement configuration indicating a duration pattern for reference signal monitoring associated with a set of beams and for tuning a radio of the UE for the reference signal monitoring, each beam of the set of beams associated with a respective one of a set of bandwidth parts of a radio frequency spectrum according to a beam frequency mapping. The communication manager 1410 may be configured to provide or support a means for transmitting, based on the duration pattern indicated by the beam measurement configuration, reference signals for the set of beams, where the transmitting of the reference signals includes transmitting the respective reference signal for each beam of the set of beams using the respective bandwidth part associated with each beam according to the beam frequency mapping.

By including or configuring the communication manager 1410 in accordance with examples as described herein, the device 1405 may support improved techniques for beam measurement and mobility in a wireless communications system. For example, by indicating duration patterns for beam monitoring that include both a measurement duration (e.g., a duration for measuring or receiving reference signals corresponding to a beam) and one or more retuning durations (e.g., gap durations), the device 1405 may support improved flexibility and responsiveness for maintaining communication links with UEs 115 using different beams 230 that are associated with different bandwidth parts. For example, the communication manager 1410 may enable faster, more efficient, or more flexible beam selection in a system that associates respective beams with different bandwidth parts of a radio frequency spectrum, among other benefits. Such improvements may be particularly beneficial in high mobility scenarios, such as a non-terrestrial network, where movement of a transmitting device (e.g., the device 1405), a receiving device (e.g., a UE 115), or both may involve relatively frequent reselection of beams and corresponding bandwidth parts to maintain a communication link. Accordingly, including the communication manager 1410 may improve user experience associated with UEs 115 by supporting more reliable, more flexible, or more diverse techniques for maintaining a communication link.

In some examples, the communication manager 1410 may be configured to perform various operations (e.g., receiving, monitoring, transmitting) using or otherwise in cooperation with the transceiver 1420, the one or more antennas 1425, or any combination thereof. Although the communication manager 1410 is illustrated as a separate component, in some examples, one or more functions described with reference to the communication manager 1410 may be supported by or performed by the processor 1440, the memory 1430, the code 1435, or any combination thereof. For example, the code 1435 may include instructions executable by the processor 1440 to cause the device 1405 to perform various aspects of beam measurement timing in a wireless communications system as described herein, or the processor 1440 and the memory 1430 may be otherwise configured to perform or support such operations.

Figure 15:
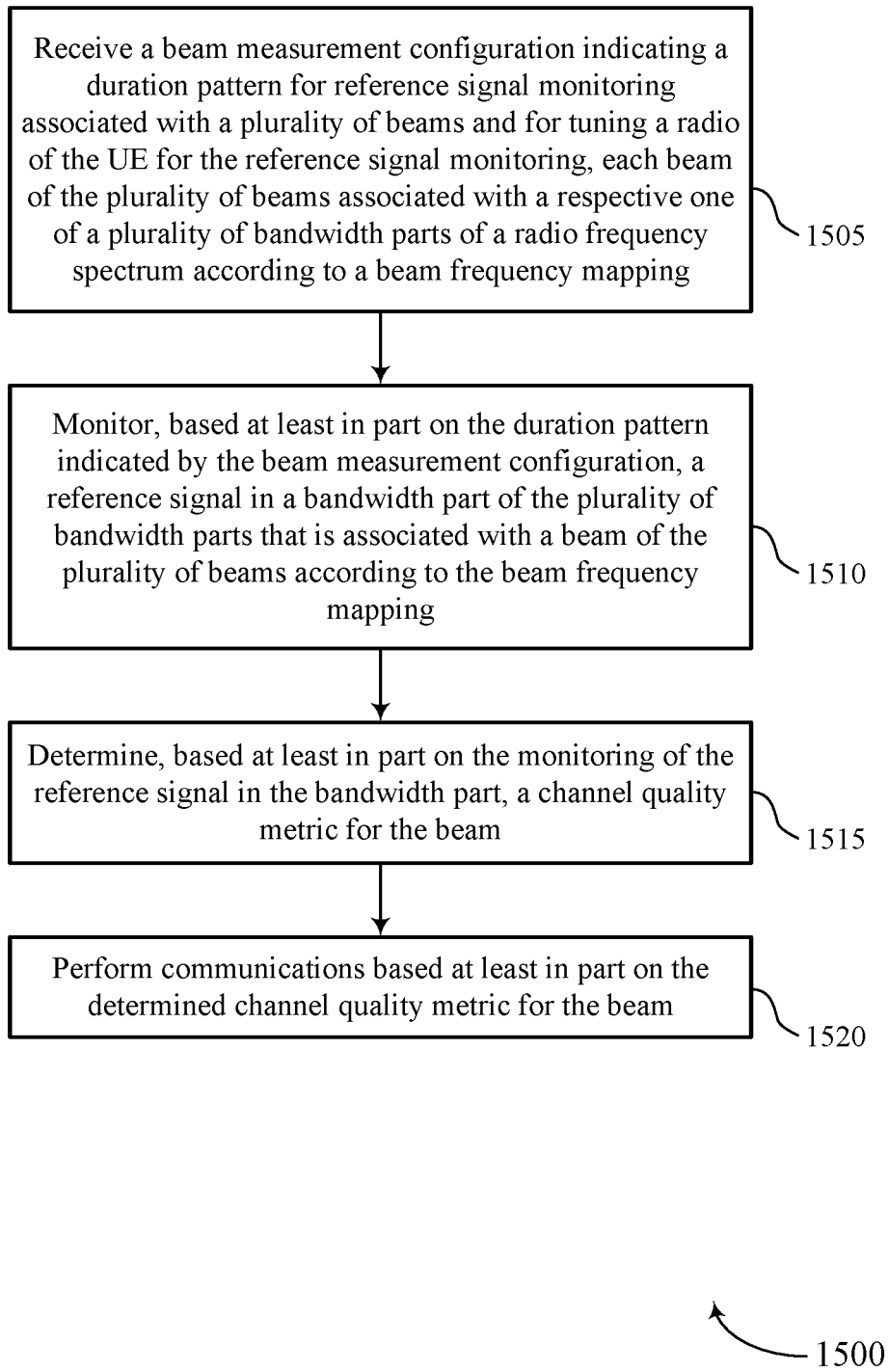

FIG. 15 shows a flowchart illustrating a method 1500 for beam measurement timing in a wireless communications system in accordance with aspects of the present disclosure. The operations of method 1500 may be implemented by a UE or its components as described herein. For example, the operations of method 1500 may be performed by a UE 115 as described with reference to FIGS. 1 through 10. In some examples, a UE may execute a set of instructions to control the functional elements of the device to perform the described functions. Additionally or alternatively, the UE may perform aspects of the described functions using special-purpose hardware.

At 1505, the method may include receiving a beam measurement configuration indicating a duration pattern for reference signal monitoring associated with a plurality of beams and for tuning a radio of the UE for the reference signal monitoring, each beam of the plurality of beams associated with a respective one of a plurality of bandwidth parts of a radio frequency spectrum according to a beam frequency mapping. The operations of 1505 may be performed according to the methods described herein. In some examples, aspects of the operations of 1505 may be performed by a beam measurement configuration component 925 as described with reference to FIG. 9.

At 1510, the method may include monitoring, based at least in part on the duration pattern indicated by the beam measurement configuration, a reference signal in a bandwidth part of the plurality of bandwidth parts that is associated with a beam of the plurality of beams according to the beam frequency mapping. The operations of 1510 may be performed according to the methods described herein. In some examples, aspects of the operations of 1510 may be performed by a reference signal monitoring component 930 as described with reference to FIG. 9.

At 1515, the method may include determining, based at least in part on the monitoring of the reference signal in the bandwidth part, a channel quality metric for the beam. The operations of 1515 may be performed according to the methods described herein. In some examples, aspects of the operations of 1515 may be performed by a channel quality determination component 935 as described with reference to FIG. 9.

At 1520, the method may include performing communications based at least in part on the determined channel quality metric for the beam. The operations of 1520 may be performed according to the methods described herein. In some examples, aspects of the operations of 1520 may be performed by a communications component 940 as described with reference to FIG. 9.

Figure 16:
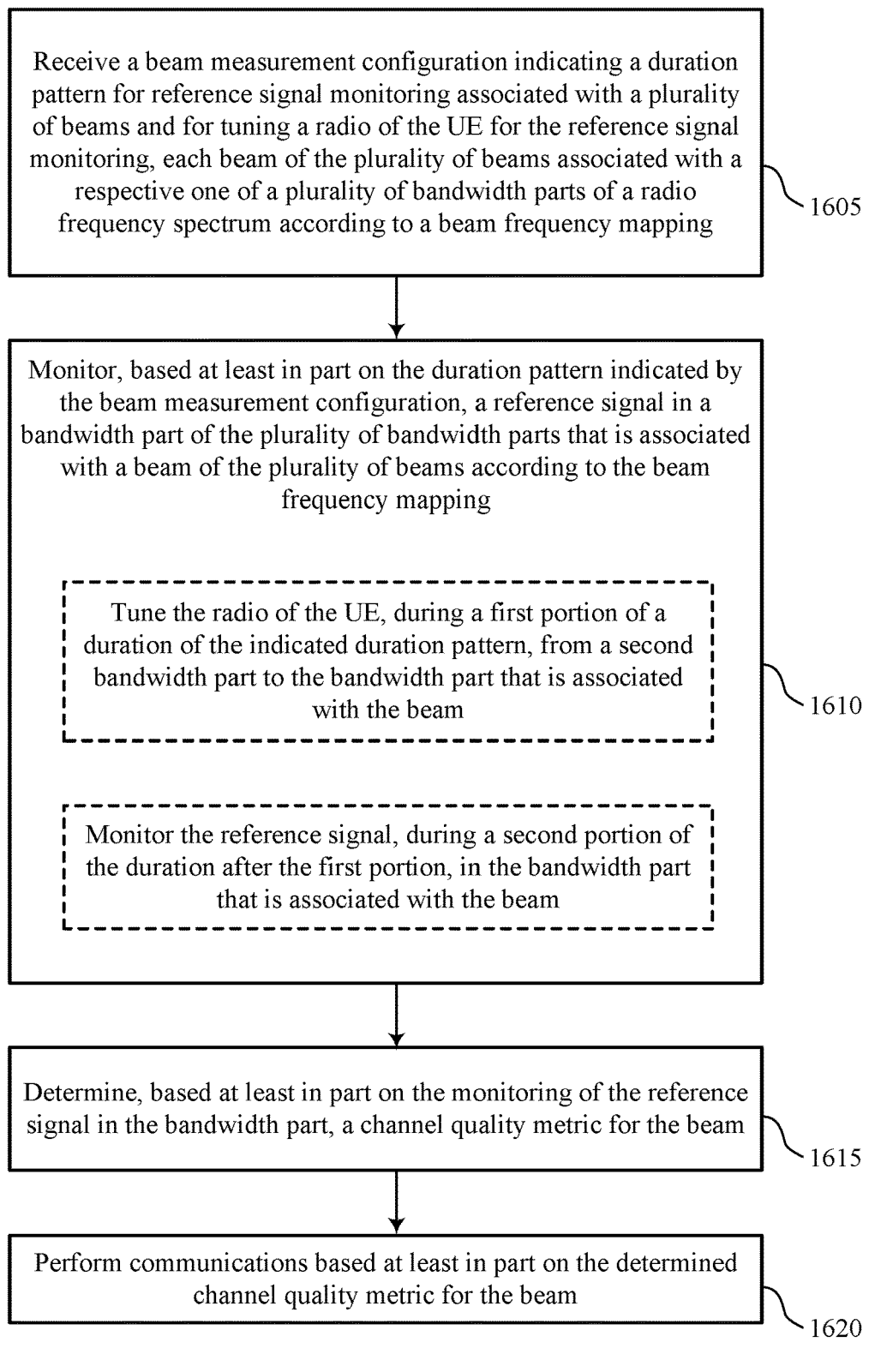

FIG. 16 shows a flowchart illustrating a method 1600 for beam measurement timing in a wireless communications system in accordance with aspects of the present disclosure. The operations of method 1600 may be implemented by a UE or its components as described herein. For example, the operations of method 1600 may be performed by a UE 115 as described with reference to FIGS. 1 through 10. In some examples, a UE may execute a set of instructions to control the functional elements of the device to perform the described functions. Additionally or alternatively, the UE may perform aspects of the described functions using special-purpose hardware.

At 1605, the method may include receiving a beam measurement configuration indicating a duration pattern for reference signal monitoring associated with a plurality of beams and for tuning a radio of the UE for the reference signal monitoring, each beam of the plurality of beams associated with a respective one of a plurality of bandwidth parts of a radio frequency spectrum according to a beam frequency mapping. The operations of 1605 may be performed according to the methods described herein. In some examples, aspects of the operations of 1605 may be performed by a beam measurement configuration component 925 as described with reference to FIG. 9.

At 1610, the method may include monitoring, based at least in part on the duration pattern indicated by the beam measurement configuration, a reference signal in a bandwidth part of the plurality of bandwidth parts that is associated with a beam of the plurality of beams according to the beam frequency mapping. In some examples, the monitoring may include tuning the radio of the UE, during a first portion of a duration of the indicated duration pattern, from a second bandwidth part to the bandwidth part that is associated with the beam, and monitoring the reference signal, during a second portion of the duration after the first portion, in the bandwidth part that is associated with the beam. The operations of 1610 may be performed according to the methods described herein. In some examples, aspects of the operations of 1610 may be performed by a reference signal monitoring component 930 as described with reference to FIG. 9.

At 1615, the method may include determining, based at least in part on the monitoring of the reference signal in the bandwidth part, a channel quality metric for the beam. The operations of 1615 may be performed according to the methods described herein. In some examples, aspects of the operations of 1615 may be performed by a channel quality determination component 935 as described with reference to FIG. 9.

At 1620, the method may include performing communications based at least in part on the determined channel quality metric for the beam. The operations of 1620 may be performed according to the methods described herein. In some examples, aspects of the operations of 1620 may be performed by a communications component 940 as described with reference to FIG. 9.

Figure 17:
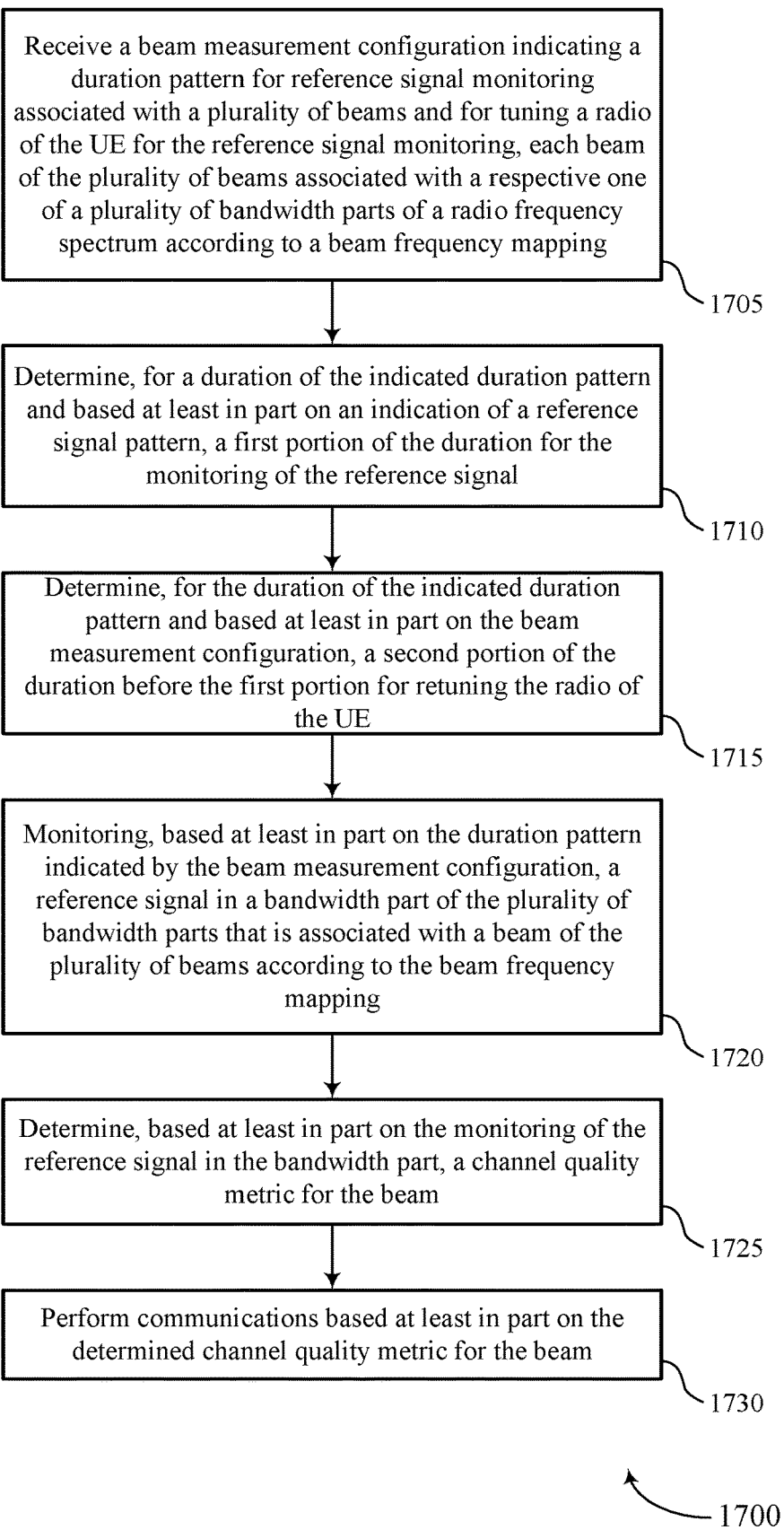

FIG. 17 shows a flowchart illustrating a method 1700 for beam measurement timing in a wireless communications system in accordance with aspects of the present disclosure. The operations of method 1700 may be implemented by a UE or its components as described herein. For example, the operations of method 1700 may be performed by a UE 115 as described with reference to FIGS. 1 through 10. In some examples, a UE may execute a set of instructions to control the functional elements of the device to perform the described functions. Additionally or alternatively, the UE may perform aspects of the described functions using special-purpose hardware.

At 1705, the method may include receiving a beam measurement configuration indicating a duration pattern for reference signal monitoring associated with a plurality of beams and for tuning a radio of the UE for the reference signal monitoring, each beam of the plurality of beams associated with a respective one of a plurality of bandwidth parts of a radio frequency spectrum according to a beam frequency mapping. The operations of 1705 may be performed according to the methods described herein. In some examples, aspects of the operations of 1705 may be performed by a beam measurement configuration component 925 as described with reference to FIG. 9.

At 1710, the method may include determining, for a duration of the indicated duration pattern and based at least in part on an indication of a reference signal pattern, a first portion of the duration for the monitoring of the reference signal. The operations of 1710 may be performed according to the methods described herein. In some examples, aspects of the operations of 1710 may be performed by a monitoring duration determination component 955 as described with reference to FIG. 9.

At 1715, the method may include determining, for the duration of the indicated duration pattern and based at least in part on the beam measurement configuration, a second portion of the duration before the first portion for retuning the radio of the UE. The operations of 1715 may be performed according to the methods described herein. In some examples, aspects of the operations of 1715 may be performed by a monitoring duration determination component 955 as described with reference to FIG. 9.

At 1720, the method may include monitoring, based at least in part on the duration pattern indicated by the beam measurement configuration (e.g., during the duration of the indicated duration pattern), a reference signal in a bandwidth part of the plurality of bandwidth parts that is associated with a beam of the plurality of beams according to the beam frequency mapping. The operations of 1720 may be performed according to the methods described herein. In some examples, aspects of the operations of 1720 may be performed by a reference signal monitoring component 930 as described with reference to FIG. 9.

At 1725, the method may include determining, based at least in part on the monitoring of the reference signal in the bandwidth part, a channel quality metric for the beam. The operations of 1725 may be performed according to the methods described herein. In some examples, aspects of the operations of 1725 may be performed by a channel quality determination component 935 as described with reference to FIG. 9.

At 1730, the method may include performing communications based at least in part on the determined channel quality metric for the beam. The operations of 1730 may be performed according to the methods described herein. In some examples, aspects of the operations of 1730 may be performed by a communications component 940 as described with reference to FIG. 9.

FIG. 18 shows a flowchart illustrating a method 1800 for beam measurement timing in a wireless communications system in accordance with aspects of the present disclosure. The operations of method 1800 may be implemented by a device 1105, device 1205, device 1405, a satellite 120, a gateway 210, a combination of a satellite 120 and a gateway 210, or a base station 105, as described with reference to FIGS. 1 through 6 and 11 through 14. In some examples, such devices or systems may execute a set of instructions to control the functional elements of the device to perform the described functions. Additionally or alternatively, such devices or systems may perform aspects of the described functions using special-purpose hardware.

At 1805, the method may include transmitting a beam measurement configuration indicating a duration pattern for reference signal monitoring associated with a plurality of beams and for tuning a radio of the UE for the reference signal monitoring, each beam of the plurality of beams associated with a respective one of a plurality of bandwidth parts of a radio frequency spectrum according to a beam frequency mapping. The operations of 1805 may be performed according to the methods described herein. In some examples, aspects of the operations of 1805 may be performed by a beam measurement configuration indication component 1325 as described with reference to FIG. 13.

At 1810, the method may include transmitting, based at least in part on the duration pattern indicated by the beam measurement configuration, reference signals for the plurality of beams, wherein the transmitting of the reference signals comprises transmitting the respective reference signal for each beam of the plurality of beams using the respective bandwidth part associated with each beam according to the beam frequency mapping. The operations of 1810 may be performed according to the methods described herein. In some examples, aspects of the operations of 1810 may be performed by a reference signal transmission component 1330 as described with reference to FIG. 13.

Figure 19:
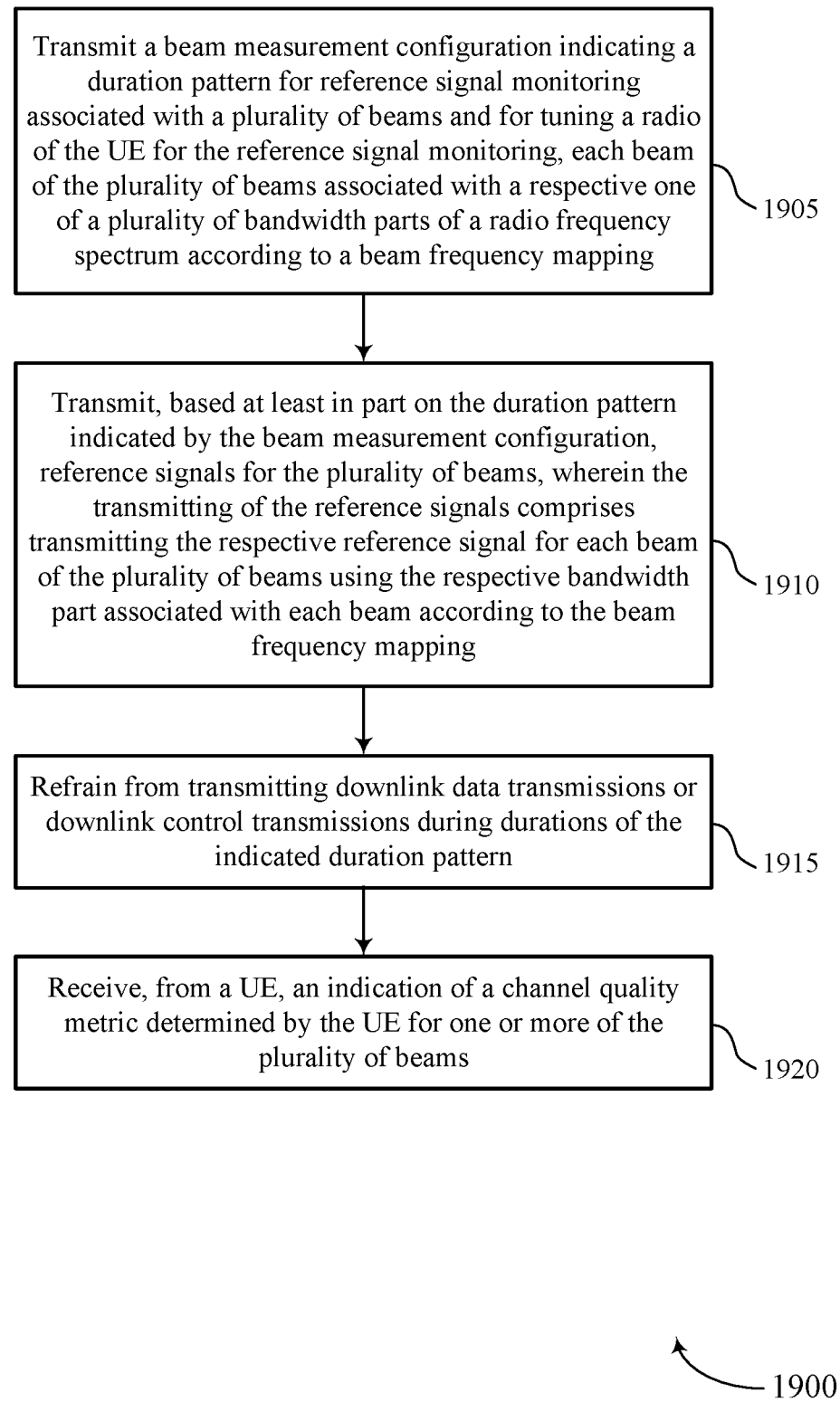

FIG. 19 shows a flowchart illustrating a method 1900 for beam measurement timing in a wireless communications system in accordance with aspects of the present disclosure. The operations of method 1900 may be implemented by a base station or its components as described herein. For example, the operations of method 1900 may be performed by a base station 105 as described with reference to FIGS. 1 through 6 and 11 through 14. In some examples, a base station may execute a set of instructions to control the functional elements of the device to perform the described functions. Additionally or alternatively, the base station may perform aspects of the described functions using special-purpose hardware.

At 1905, the method may include transmitting a beam measurement configuration indicating a duration pattern for reference signal monitoring associated with a plurality of beams and for tuning a radio of the UE for the reference signal monitoring, each beam of the plurality of beams associated with a respective one of a plurality of bandwidth parts of a radio frequency spectrum according to a beam frequency mapping. The operations of 1905 may be performed according to the methods described herein. In some examples, aspects of the operations of 1905 may be performed by a beam measurement configuration indication component 1325 as described with reference to FIG. 13.

At 1910, the method may include transmitting, based at least in part on the duration pattern indicated by the beam measurement configuration, reference signals for the plurality of beams, wherein the transmitting of the reference signals comprises transmitting the respective reference signal for each beam of the plurality of beams using the respective bandwidth part associated with each beam according to the beam frequency mapping. The operations of 1910 may be performed according to the methods described herein. In some examples, aspects of the operations of 1910 may be performed by a reference signal transmission component 1330 as described with reference to FIG. 13.

At 1915, the method may include refraining from transmitting downlink data transmissions or downlink control transmissions during durations of the indicated duration pattern. The operations of 1915 may be performed according to the methods described herein. In some examples, aspects of the operations of 1915 may be performed by a downlink communications transmission component 1335 as described with reference to FIG. 13.

At 1920, the method may include receiving (e.g., from a UE) an indication of a channel quality metric determined for one of more of the plurality of beams. The operations of 1920 may be performed according to the methods described herein. In some examples, aspects of the operations of 1920 may be performed by a channel quality indication reception component 1340 as described with reference to FIG. 13.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, the method comprising: receiving a beam measurement configuration indicating a duration pattern for reference signal monitoring associated with a plurality of beams and for tuning a radio of the UE for the reference signal monitoring, each beam of the plurality of beams associated with a respective one of a plurality of bandwidth parts of a radio frequency spectrum according to a beam frequency mapping; monitoring, based at least in part on the duration pattern indicated by the beam measurement configuration, a reference signal in a bandwidth part of the plurality of bandwidth parts that is associated with a beam of the plurality of beams according to the beam frequency mapping; determining, based at least in part on the monitoring of the reference signal in the bandwidth part, a channel quality metric for the beam; and performing communications based at least in part on the determined channel quality metric for the beam.

Aspect 2: The method of aspect 1, wherein the monitoring comprises: tuning the radio of the UE, during a first portion of a duration of the indicated duration pattern, from a second bandwidth part to the bandwidth part that is associated with the beam; and monitoring the reference signal, during a second portion of the duration after the first portion, in the bandwidth part that is associated with the beam.

Aspect 3: The method of aspect 2, wherein the monitoring comprises: tuning the radio of the UE, during a third portion of the duration after the second portion, from the bandwidth part associated with the beam to the second bandwidth part.

Aspect 4: The method of aspect 3, further comprising: determining the first portion of the duration, the third portion of the duration, or both based at least in part on the beam measurement configuration and an indicated reference signal pattern.

Aspect 5: The method of aspect 3 or 4, further comprising: determining the first portion of the duration, the third portion of the duration, or both based at least in part on a tuning capability of the UE.

Aspect 6: The method of any of aspects 2 through 5, wherein the monitoring comprises: identifying that the duration overlaps with a second duration of the indicated duration pattern during an overlap duration that follows the second portion of the duration; tuning the radio of the UE, during the overlap duration, from the bandwidth part associated with the beam to a third bandwidth part of the plurality of bandwidth parts that is associated with a second beam according to the beam frequency mapping; and monitoring a second reference signal in the third bandwidth part that is associated with the second beam during the second duration.

Aspect 7: The method of any of aspects 1 through 6, wherein the monitoring comprises: monitoring, during a first duration of the indicated duration pattern, the reference signal in the bandwidth part associated with the beam; and monitoring, during a second duration of the indicated duration pattern, a second reference signal in a second bandwidth part of the plurality of bandwidth parts that is associated with a second beam of the plurality of beams according to the beam frequency mapping.

Aspect 8: The method of any of aspects 1 through 6, wherein the monitoring comprises: monitoring, during a duration of the indicated duration pattern, the reference signal in the bandwidth part associated with the beam; and monitoring, during the duration of the indicated duration pattern, a second reference signal in a second bandwidth part of the plurality of bandwidth parts that is associated with a second beam of the plurality of beams according to the beam frequency mapping.

Aspect 9: The method of any of aspects 1 through 8, further comprising: refraining from monitoring for downlink data transmissions or downlink control transmissions during durations of the indicated duration pattern.

Aspect 10: The method of any of aspects 1 through 9, wherein the beam measurement configuration comprises an indication of a periodicity, a length of time, a time offset, or any combination thereof for durations of the duration pattern.

Aspect 11: The method of any of aspects 1 through 10, further comprising: determining, for a duration of the indicated duration pattern and based at least in part on an indication of a reference signal pattern, a first portion of the duration for the monitoring of the reference signal; and determining, for the duration of the indicated duration pattern and based at least in part on the beam measurement configuration, a second portion of the duration before the first portion for retuning the radio of the UE.

Aspect 12: The method of aspect 11, wherein the reference signal pattern comprises a channel state information reference signal pattern or a synchronization signal block pattern, or a combination thereof.

Aspect 13: The method of any of aspects 1 through 12, wherein the performing communications comprises: transmitting an indication of the channel quality metric for the beam.

Aspect 14: The method of any of aspects 1 through 13, wherein the receiving the beam measurement configuration comprises: receiving the beam measurement configuration from a node of a non-terrestrial network.

Aspect 15: The method of any of aspects 1 through 14, wherein the monitoring comprises: monitoring beam transmissions of a node of a non-terrestrial network.

Aspect 16: A method for wireless communication at a node of a non-terrestrial network, the method comprising: transmitting a beam measurement configuration indicating a duration pattern for reference signal monitoring associated with a plurality of beams and for tuning a radio of the UE for the reference signal monitoring, each beam of the plurality of beams associated with a respective one of a plurality of bandwidth parts of a radio frequency spectrum according to a beam frequency mapping; transmitting, based at least in part on the duration pattern indicated by the beam measurement configuration, reference signals for the plurality of beams, wherein the transmitting of the reference signals comprises transmitting the respective reference signal for each beam of the plurality of beams using the respective bandwidth part associated with each beam according to the beam frequency mapping.

Aspect 17: The method of aspect 16, wherein the transmitting of the reference signals comprises: refraining from transmitting the reference signals during a first portion of a duration of the indicated duration pattern; and transmitting a reference signal during a second portion of the duration after the first portion.

Aspect 18: The method of aspect 17, wherein the transmitting of the reference signals comprises: refraining from transmitting the reference signals during a third portion of the duration after the second portion.

Aspect 19: The method of aspect 17 or 18, wherein the transmitting of the reference signals comprises: refraining from transmitting the reference signals after the second portion of the duration and during an overlap of the duration and a second duration of the indicated duration pattern.

Aspect 20: The method of any of aspects 16 through 19, wherein the transmitting of the reference signals comprises: transmitting, during a first duration of the indicated duration pattern, a first reference signal for a first beam of the plurality of beams using a first bandwidth part of the plurality of bandwidth parts associated with the first beam according to the beam frequency mapping; and transmitting, during a second duration of the indicated duration pattern, a second reference signal for a second beam of the plurality of beams using a second bandwidth part of the plurality of bandwidth parts, different than the first bandwidth part, associated with the second beam according to the beam frequency mapping.

Aspect 21: The method of any of aspects 16 through 19, wherein the transmitting of the reference signals comprises: transmitting, during a duration of the indicated duration pattern, a first reference signal for a first beam of the plurality of beams using a first bandwidth part associated with the first beam according to the beam frequency mapping, and a second reference signal for a second beam of the plurality of beams using a second bandwidth part, different than the first bandwidth part, associated with the second beam according to the beam frequency mapping.

Aspect 22: The method of any of aspects 16 through 21, further comprising: refraining from transmitting downlink data transmissions or downlink control transmissions during durations of the indicated duration pattern.

Aspect 23: The method of any of aspects 16 through 22, wherein the beam measurement configuration comprises an indication of a periodicity, a length of time, a time offset, or any combination thereof associated with the duration pattern.

Aspect 24: The method of any of aspects 16 through 23, wherein the beam measurement configuration comprises an indication to determine one or more gap portions, for retuning operations during durations of the duration pattern, based at least in part on an indicated reference signal pattern.

Aspect 25: The method of aspect 24, wherein the indicated reference signal pattern comprises a channel state information reference signal pattern, or a synchronization signal block pattern, or a combination thereof.

Aspect 26: The method of any of aspects 16 through 25, further comprising: receiving, from a UE, an indication of a channel quality metric determined by the UE for one or more of the plurality of beams.

Aspect 27: An apparatus for wireless communication at a UE, comprising a processor; memory coupled with the processor; and instructions stored in the memory and operable, when executed by the processor, to cause the apparatus to perform a method of any of aspects 1 through 15.

Aspect 28: An apparatus for wireless communication at a UE, comprising at least one means for performing a method of any of aspects 1 through 15.

Aspect 29: A non-transitory computer-readable medium storing code for wireless communication at a UE, the code comprising instructions executable by a processor to perform a method of any of aspects 1 through 15.

Aspect 30: An apparatus for wireless communication at a node of a non-terrestrial network, comprising a processor; memory coupled with the processor; and instructions stored in the memory and operable, when executed by the processor, to cause the apparatus to perform a method of any of aspects 16 through 26.

Aspect 31: An apparatus for wireless communication at a node of a non-terrestrial network, comprising at least one means for performing a method of any of aspects 16 through 26.

Aspect 32: A non-transitory computer-readable medium storing code for wireless communication at a node of a non-terrestrial network, the code comprising instructions executable by a processor to perform a method of any of aspects 16 through 26.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication, comprising:
one or more processors; and
one or more memories comprising instructions executable by the one or more processors to cause the apparatus to:
receive a configuration indicating a pattern of one or more durations for at least one of: reference signal monitoring associated with a plurality of beams or tuning a radio of a user equipment (UE) for the reference signal monitoring, each beam of the plurality of beams associated with a respective one of a plurality of bandwidth parts of a radio frequency spectrum according to a beam frequency mapping;
monitor, based at least in part on the pattern indicated by the configuration, one or more reference signals including a first reference signal in a bandwidth part of the plurality of bandwidth parts that is associated with a beam of the plurality of beams according to the beam frequency mapping, wherein, to monitor the one or more reference signals, the instructions are executable by the one or more processors cause the apparatus to tune the radio of the UE, during a first portion of a duration of the indicated pattern, from a second bandwidth part to the bandwidth part that is associated with the beam and monitor the first reference signal, during a second portion of the duration after the first portion, in the bandwidth part that is associated with the beam; and
perform communications based at least in part on a channel quality metric for the beam, said channel quality metric for the beam being based at least in part on the monitoring of the first reference signal in the bandwidth part.

2. The apparatus of claim 1, wherein, to monitor the one or more reference signals, the instructions are executable by the one or more processors to cause the apparatus to:
tune the radio of the UE, during a third portion of the duration after the second portion, from the bandwidth part associated with the beam to the second bandwidth part.

3. The apparatus of claim 2, wherein the first portion of the duration, the third portion of the duration, or both are based at least in part on the configuration and an indicated reference signal pattern.

4. The apparatus of claim 2, wherein the first portion of the duration, the third portion of the duration, or both are based at least in part on a tuning capability of the UE.

5. The apparatus of claim 1, wherein, to monitor the one or more reference signals, the instructions are executable by the one or more processors to cause the apparatus to:
tune the radio of the UE, during a second duration that follows the second portion of the duration and that overlaps with a third duration of the indicated pattern, from the bandwidth part associated with the beam to a third bandwidth part of the plurality of bandwidth parts that is associated with a second beam according to the beam frequency mapping; and
monitor a second reference signal in the third bandwidth part that is associated with the second beam during the third duration.

6. The apparatus of claim 1, wherein, to monitor the one or more reference signals, the instructions are executable by the one or more processors to cause the apparatus to:
monitor, during a first duration of the indicated pattern, the first reference signal in the bandwidth part associated with the beam; and
monitor, during a second duration of the indicated pattern, a second reference signal in a second bandwidth part of the plurality of bandwidth parts that be associated with a second beam of the plurality of beams according to the beam frequency mapping.

7. The apparatus of claim 1, wherein, to monitor the one or more reference signals, the instructions are executable by the one or more processors to cause the apparatus to:
monitor, during the duration of the indicated pattern, the first reference signal in the bandwidth part associated with the beam; and
monitor, during the duration of the indicated pattern, a second reference signal in a second bandwidth part of the plurality of bandwidth parts that is associated with a second beam of the plurality of beams according to the beam frequency mapping.

8. The apparatus of claim 1, wherein the instructions are further executable by the one or more processors to cause the apparatus to:
refrain from monitoring for downlink data transmissions or downlink control transmissions during the one or more durations of the indicated pattern.

9. The apparatus of claim 1, wherein the configuration comprises an indication of a periodicity, a length of time, a time offset, or any combination thereof for the one or more durations of the indicated pattern.

10. The apparatus of claim 1, wherein the instructions are executable by the one or more processors to cause the apparatus to:
monitor the first reference signal during a first portion of a duration of the indicated pattern, the monitoring being based at least in part on an indication of a reference signal pattern.

11. The apparatus of claim 10, wherein the reference signal pattern comprises a channel state information reference signal pattern or a synchronization signal block pattern, or a combination thereof.

12. The apparatus of claim 1, further comprising a transceiver, wherein:
the instructions to perform the communications are executable by the one or more processors to cause the apparatus to: transmit, via the transceiver, an indication of the channel quality metric for the beam; and
the apparatus is configured as the user equipment.

13. The apparatus of claim 1, wherein the instructions to receive the configuration are executable by the one or more processors to cause the apparatus to:
receive the configuration from a node of a non-terrestrial network.

14. The apparatus of claim 1, wherein the instructions for the monitoring are by the one or more processors to cause the apparatus to:
monitor beam transmissions of a node of a non-terrestrial network.

15. A node of a non-terrestrial network, comprising:
a transceiver;
one or more processors; and
one or more memories comprising instructions executable by the one or more processors to cause the node to:
transmit, via the transceiver, a configuration indicating a pattern of one or more durations for at least one of: reference signal monitoring associated with a plurality of beams or tuning a radio of a user equipment (UE) for the reference signal monitoring, each beam of the plurality of beams associated with a respective one of a plurality of bandwidth parts of a radio frequency spectrum according to a beam frequency mapping;
transmit, via the transceiver and based at least in part on the pattern indicated by the configuration, reference signals for the plurality of beams, wherein the transmitting of the reference signals comprises transmitting the respective reference signal for each beam of the plurality of beams using the respective bandwidth part associated with each beam according to the beam frequency mapping, wherein, to transmit the reference signals, the instructions executable by the one or more processors cause the node to refrain from transmitting the reference signals during a first portion of a duration of the indicated pattern and transmit, via the transceiver, a reference signal during a second portion of the duration after the first portion.

16. The node of claim 15, wherein, to transmit the reference signals, the instructions are executable by the one or more processors to cause the node to:
refrain from transmitting the reference signals during a third portion of the duration after the second portion.

17. The node of claim 15, wherein, to transmit the reference signals, the instructions are executable by the one or more processors to cause the node to:
refrain from transmitting the reference signals after the second portion of the duration and during an overlap of the duration and a second duration of the indicated pattern.

18. The node of claim 15, wherein, to transmit the reference signals, the instructions are executable by the one or more processors to cause the node to:
transmit, via the transceiver and during a first duration of the indicated pattern, a first reference signal for a first beam of the plurality of beams using a first bandwidth part of the plurality of bandwidth parts associated with the first beam according to the beam frequency mapping; and
transmit, via the transceiver and during a second duration of the indicated pattern, a second reference signal for a second beam of the plurality of beams using a second bandwidth part of the plurality of bandwidth parts, different than the first bandwidth part, associated with the second beam according to the beam frequency mapping.

19. The node of claim 15, wherein, to transmit the reference signals, the instructions are executable by the one or more processors to cause the node to:
transmit, via the transceiver and during the duration of the indicated pattern, a first reference signal for a first beam of the plurality of beams using a first bandwidth part associated with the first beam according to the beam frequency mapping, and a second reference signal for a second beam of the plurality of beams using a second bandwidth part, different than the first bandwidth part, associated with the second beam according to the beam frequency mapping.

20. The node of claim 15, wherein the instructions are further executable by the one or more processors to cause the node to:
refrain from transmitting downlink data transmissions or downlink control transmissions during the one or more durations of the indicated pattern.

21. The node of claim 15, wherein the configuration comprises an indication of a periodicity, a length of time, a time offset, or any combination thereof associated with the pattern.

22. The node of claim 15, wherein the configuration comprises an indication to determine one or more gap portions, for retuning operations during the one or more durations of the pattern, based at least in part on an indicated reference signal pattern.

23. The node of claim 22, wherein the indicated reference signal pattern comprises a channel state information reference signal pattern, or a synchronization signal block pattern, or a combination thereof.

24. The node of claim 15, wherein the instructions are further executable by the one or more processors to cause the node to:
receive, from the UE, an indication of a channel quality metric for one or more of the plurality of beams.

25. A method for wireless communication at a user equipment (UE), the method comprising:
receiving a configuration indicating a pattern for at least one of: reference signal monitoring associated with a plurality of beams or tuning a radio of the UE for the reference signal monitoring, each beam of the plurality of beams associated with a respective one of a plurality of bandwidth parts of a radio frequency spectrum according to a beam frequency mapping;
monitoring, based at least in part on the pattern indicated by the configuration, one or more reference signals including a first reference signal in a bandwidth part of the plurality of bandwidth parts that is associated with a beam of the plurality of beams according to the beam frequency mapping, wherein the monitoring comprises tuning the radio of the UE, during a first portion of a duration of the indicated pattern, from a second bandwidth part to the bandwidth part that is associated with the beam and monitoring the first reference signal, during a second portion of the duration after the first portion, in the bandwidth part that is associated with the beam; and performing communications based at least in part on a channel quality metric for the beam, said channel quality metric for the beam being based at least in part on the monitoring of the first reference signal in the bandwidth part.

26. The method of claim 25, wherein the monitoring comprises:

tuning the radio of the UE, during a third portion of the duration after the second portion, from the bandwidth part associated with the beam to the second bandwidth part.

27. A method for wireless communication at a node of a non-terrestrial network, the method comprising:

transmitting a configuration indicating a pattern for reference signal monitoring associated with a plurality of beams and for tuning a radio of a UE for the reference signal monitoring, each beam of the plurality of beams associated with a respective one of a plurality of bandwidth parts of a radio frequency spectrum according to a beam frequency mapping; and transmitting, based at least in part on the pattern indicated by the configuration, reference signals for the plurality of beams, wherein the transmitting of the reference signals comprises transmitting the respective reference signal for each beam of the plurality of beams using the respective bandwidth part associated with each beam according to the beam frequency mapping, wherein the transmitting the reference signals comprises refraining from transmitting the reference signals during a first portion of a duration of the indicated pattern and transmitting, via a transceiver, a reference signal during a second portion of the duration after the first portion.

28. The apparatus of claim 10, further comprising:

retune the radio of the UE during a second portion of the duration of the indicated pattern based at least in part on the configuration, wherein the second portion occurs before the first portion.

* * * * *